United States Patent [19]

Berglund et al.

[11] 4,258,417
[45] Mar. 24, 1981

[54] SYSTEM FOR INTERFACING BETWEEN MAIN STORE MEMORY AND A CENTRAL PROCESSOR

[75] Inventors: Neil C. Berglund, Kasson; David A. Luick, Rochester, both of Minn.

[73] Assignee: International Business Machines Corporation, Armonk, N.Y.

[21] Appl. No.: 954,067

[22] Filed: Oct. 23, 1978

[51] Int. Cl.³ .............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,398,405 | 8/1968 | Carlson et al. | 364/200 |
| 3,909,791 | 9/1975 | Van Den Berg | 364/900 |
| 4,014,006 | 3/1977 | Sorensen et al. | 364/200 |
| 4,040,027 | 8/1977 | Van Es et al. | 364/900 |
| 4,063,081 | 12/1977 | Handly et al. | 364/200 |
| 4,075,692 | 2/1978 | Sorensen et al. | 364/200 |
| 4,091,455 | 5/1978 | Woods et al. | 364/200 |

*Primary Examiner*—Leo H. Boudreau
*Attorney, Agent, or Firm*—Richards, Harris & Medlock

[57] ABSTRACT

Improved efficiency in the operation of a computer system is achieved by interface logic that controls the operating rate of a central processing unit to be compatible with the slower operating rate of main memory. Microinstructions are decoded and interlock latches are generated to provide a main store interface holdoff signal that is applied to holdoff latch logic. Normally, the holdoff latch logic provides load control signals to sequence the operating cycle of the central processing unit. Under certain identified microinstruction conditions, an interlock latch is generated and the load control signals are not output from the holdoff logic, thereby inhibiting the sequencing operation of the central processing unit. Interlock latches that are generated include a register-in-use interlock and an invalid data interlock for each register that is used to fetch data from and store data into main memory.

48 Claims, 10 Drawing Figures

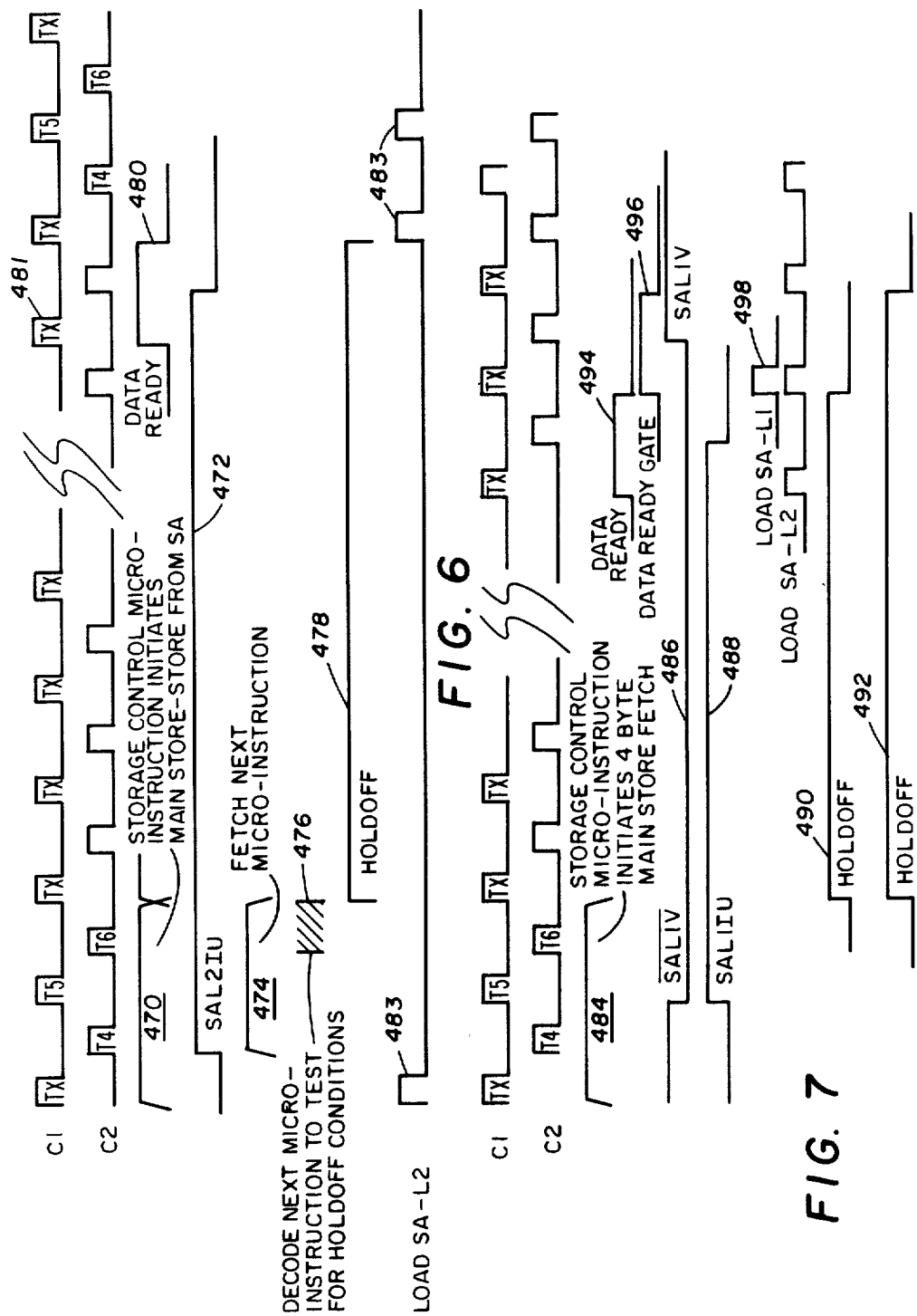

SYSTEM FOR INTERFACING BETWEEN MAIN STORE MEMORY AND A CENTRAL PROCESSOR

DESCRIPTION

Technical Field

This invention relates to hardware for interfacing between main storage and a central processing unit, and more particularly to hardware for interfacing between a main storage operating at a first rate and a central processing unit operating at a second rate.

In accordance with the present invention, the productivity of a fast central processing unit connected to a slower main storage memory is maximized. This maximization of productivity is achieved by overlapping the operation of the central processing unit with the operation of the main storage. Further, the productivity of a central processing unit is maximized by enabling the main storage memory to receive commands contiguously; that is, a subsequent main storage command may be issued before the first command has been completed. Increased productivity of the central processing unit is also achieved by enabling the central processing unit to generate operating codes as if the main storage memory is continuously available.

Maximization of productivity of a central processing unit connected to a slower main storage memory is achieved by hardware interlocks that function when the microprogram issuing the instruction codes steps ahead of the operation of the main storage memory. By means of these hardware interlocks, the central processing unit is inhibited from operating only so long as an interlock exists and then only for the minimum time possible. These hardware interlocks also inhibit operation of the central processing unit whenever data received by an interface register is an error.

Background Art

Heretofore, computer systems have been implemented by controlling the speed of the processing cycle to be compatible with the speed of the operating cycle of the main storage memory. Although this makes for a rather simple design that is easy to use, the operating efficiency of such systems is rather unimpressive. Cost dictates that the operating rate of the main storage memory is slower than the operation of the central processing unit and the entire system suffers as it is able to operate only as fast as the operating cycle of the main storage memory. In computer systems requiring a large memory the cost of packaging, powering, and cooling a main storage memory to operate at a cycle as fast as the central processing unit is prohibitive.

In an attempt to overcome this disadvantage, large computer systems utilize small highspeed buffers (cache memories) interconnecting the central processing unit and the main storage memory. Thus, the cache memory serves as a buffer between the slow operating cycle of the main storage memory and the faster operating cycle of the central operating unit. Using cache memories is one technique for maintaining continuously the operating cycle of the central processing unit. Such memories, however, also significantly add to the cost of the total system. Thus, the prior art only shows systems which require expensive cache memories or limits the performance of the system by fixing the rate of operation of the central processing unit to the somewhat slower rate of operation of the main storage memory.

BRIEF DESCRIPTION OF DRAWINGS

A more complete understanding of the invention and its advantages will be apparent from the specification and claims and from the accompanying drawings illustrative of the invention.

Referring to the drawings:

FIG. 5 is a block diagram of holdoff logic for maintaining the operation rate of a central processing unit to be compatible with the operation rate of main storage memory; and FIGS. 6–10 are a series of timing diagrams illustrating the operation of the logic of FIGS. 3–5.

DETAILED DESCRIPTION

Figure 1:
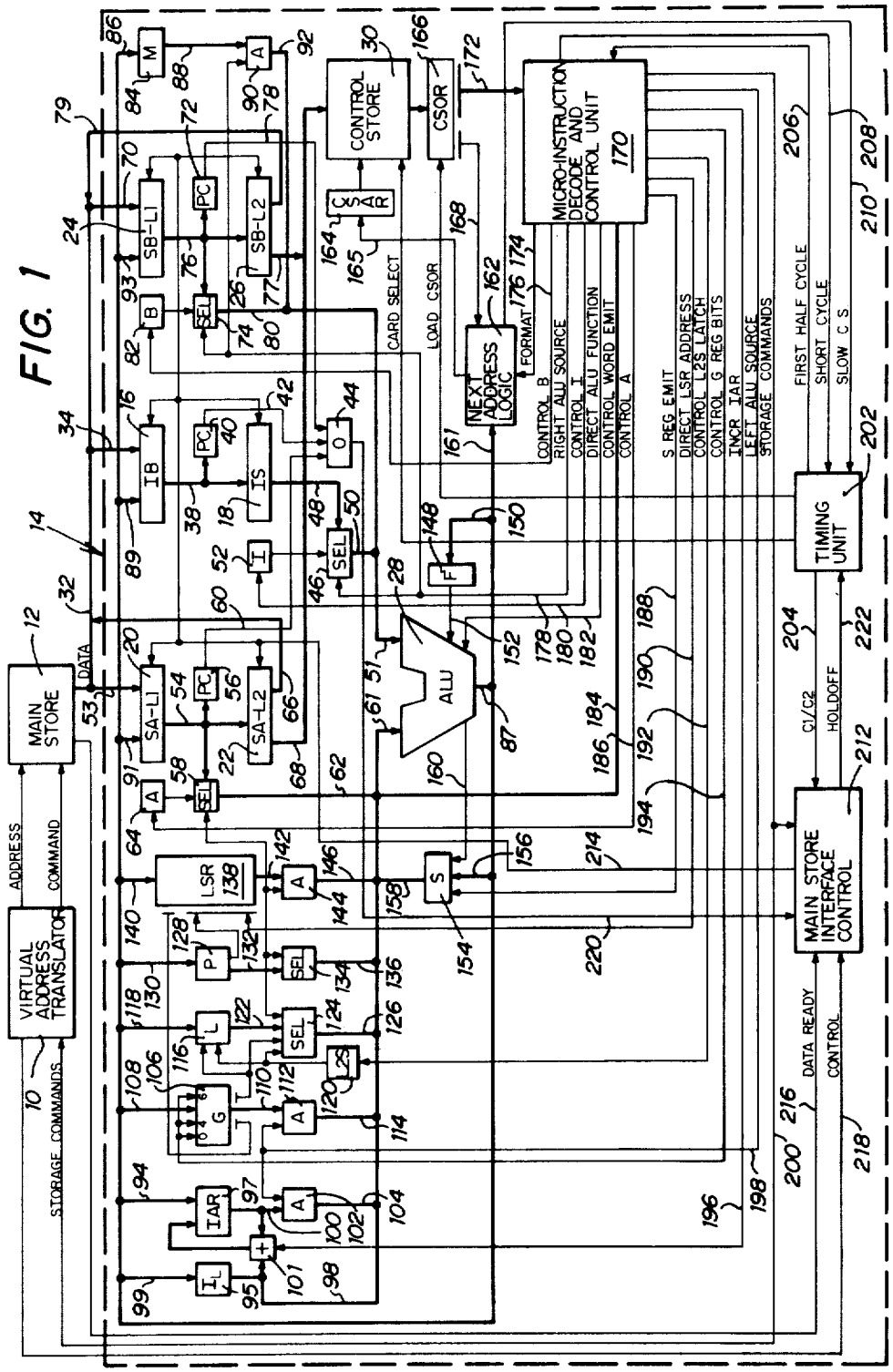
FIG. 1 is a logic block diagram of a computer system including interface logic for coupling the operation of a central processing unit to a main storage memory.

Referring now to the drawings in which like reference characters designate like or corresponding parts throughout the several views, there is shown in FIG. 1 a diagram of a computer embodying the present invention. The computer shown in FIG. 1 includes a virtual address translator 10, a main storage memory 12 and a central processing unit (microprocessor) 14. Access to the main storage memory 12 is slower in operation than the microprocessor 14. Also, the main storage memory 12 is dynamic such that stored information will be lost over a period of time if not periodically refreshed. Main storage memory 12 operates asynchronously with microprocessor 14.

In normal operation, a computer operator provides high level instructions, sometimes referred to as macroinstructions, and other data such as operands which are stored in the main memory 12. The high level instructions and operands are fetched from the main store in response to commands from the microprocessor 14, and the high level instructions are executed in the microprocessor. Commands and addresses are transmitted from the microprocessor 14 to the main memory 12 through the virtual address translator 10. The primary function of the virtual address translator 10 is to translate the virtual addresses received from the microprocessor 14 into real addresses for use in accessing data in the main memory store 12.

Execution of the high level instructions occurs in the microprocessor in two phases commonly referred to as an I-phase and an E-phase. The I-phase occurs immediately prior to the E-phase. During the I-phase, the microprocessor executes a plurality of microinstructions to prepare the microprocessor for performing a mathematical or logical operation specified by the high level instruction. For instance, the high level instruction is decoded, if necessary, and operands are fetched from the main memory 12 and transferred to the microprocessor 14 in the I-phase of execution. During the E-Phase, an arithmetic or logical operation is performed on the operands as specified by the high level instruction.

The microprocessor 14 includes registers 16 and 18 for receiving high level instructions. Instruction buffer (IB) register 16 receives high level instructions and transfers them in a parallel shift to instruction stream register 18. Registers 20, 22, 24 and 26 receive operands from the main memory 12. These registers 16, 18, 20, 22, 24 and 26 function as buffers temporarily holding information for subsequent use in the microprocessor. Buffers are needed to permit faster operation of the microprocessor 14 relative to operation of the main memory 12. The operands are gated to an arithmetic logic unit 28 (hereinafter ALU 28) for the performance of an arithmetic or logical operation specified by the high level instruction. The execution of the high level instructions in the microprocessor 14 and the general operation of the microprocessor is primarily controlled by microinstructions stored in the control store (memory) 30.

It will be appreciated that FIG. 1 is somewhat diagrammatical and is intended to present an overview of the computer in order to aid a full understanding of the present invention. For clarity of illustration, certain communication paths are represented by heavy bold lines to indicate that these paths carry data directly corresponding to information received from the main memory. Thus, the heavy bold lines may carry certain fields of data from the operands or the high level instructions or may carry the results of an arithmetic operation performed on the operands. The narrow light lines between the computer components represent control lines that carry control signals to control the operation of the microprocessor 14. Hereinafter, the heavy bold lines will be referred to as data paths, and the narrow light lines will be referred to as control lines. It will also be understood that single data paths and single control lines may indicate the presence of one or more actual conductors.

Referring now to the main memory 12, a main data path 32 is connected to the main memory and represents the data path through which information is transmitted to the microprocessor 14. The IB register 16, a 36-bit (32 data bits plus 4 parity bits) instruction backup register, receives high level instructions from the main memory 12 through a data path branch 34. Data from the IB register 16 is selectively switched or transferred through data path 38 to the IS register 18 which is a 32-bit instruction stream register. Registers 16 and 18 function as a buffer for receiving the high level instructions from the main memory 12. The data output from the IB register 16 is also applied through the data path 38 to a parity check circuit 40 which detects errors in the information stored in the IB register 16. If an error is detected, the circuit 40 applies an error signal through a control line 42 to an OR gate 44.

The instruction stream register 18 is connected to a selector 46 by a data path 48. In response to control signals, the selector 46 selects an 8-bit or 16 bit field of data stored in the IS register 18 and applies this data on a data path 50 to the right input 51 of the ALU 28. Since the ALU 28 can only process one or two bytes at a time, it is necessary to select a one or two byte field from the IS register 18 for processing in the ALU 28. This one or two byte selection by the selector 46 is controlled by a two-bit I register 52 that counts from zero to three. The output of the I register 52 is applied to the selector 46 to specify and control which of the four bytes of the IS register 18 will be selected and gated to the ALU 28 on the data path 50.

Since high level instructions may be two, four or six bytes in length, the IS register 18 may not be large enough to contain the entire instruction. Thus, the IB register 16 is provided to store high level instructions for subsequent shifting into the IS register 18. The IS register 18 in combination with the IB register 16 appears as if it were an 8-byte register to the remaining components of the microprocessor 14.

The SA-L1 register 20 and SA-L2 register 22 are both 36-bit (32 data bits plus 4 parity bits) storage registers whose primary purpose is to buffer data such as operands from main memory 12. Operands are applied through data path branch 53 to the input of register 20. The output of register 20 is connected by a data path 54 to a parity check circuit 56, the SA-L2 register 22, and a selector 58. The parity check circuit 56 makes a check for errors in the data in the storage register 20 and selectively applies an error signal through a control line 60 to the OR gate 44. The selector 58 is operable to gate one of four bytes of data stored in the register 20 to a left input 61 of the ALU 28 through a data path 62. The selector 58 functions in a manner similar to the selector 46, previously described. A two-bit A register 64 counts from zero to three to select which of the four bytes stored in the register 20 will be gated to the left ALU input 61.

The data transferred from the SA-L1 register 20 and stored in the SA-L2 register 22 may be sent back to the main storage memory 12 through a data path 66. Also, the data stored in register 22 may be applied through a data path 68 to the control store 30. In this configuration, microinstructions may be stored in the main memory 12 and transferred through the registers 20 and 22 to the control store 30. Thus, infrequently used microinstructions are stored in main memory 12 and transferred to the control store 30 for occasional use in the microprocessor 14.

The SB-L1 register 24 and SB-L2 register 26 are also 36-bit (32 data bits plus 4 parity bits) registers and perform a function similar to the registers 20 and 22, respectively. Operands and data may be transferred from the main memory 12 to the SB-L1 register 24 on a data path branch 70. The output of register 24 is connected to a parity check circuit 72, the SB-L2 register 26, and a selector 74 by a data path 76. The parity check circuit 72 is substantially similar to the parity check circuits 40 and 56. Parity check circuit 72 makes a check for erroneous information in the register 24 and produces an error signal on control line 78 which is connected to an input of the OR gate 44.

The selector 74 functions in a manner similar to the selectors 46 and 58. The selector 74 selects one of four bytes of data stored in the SB-L1 storage register 24 and gates the selected byte to the right ALU input 51 through a data path 80. A two-bit B register 82 counts from zero to three with the output of the B register 82 connected to the selector 74 to determine which of the four bytes of data in the register 24 is gated to the ALU 28.

The SB-L2 register 26 is similar in function to the SA-L2 register 22. Data output from the SB-L2 register 26 is applied through a data path 77 to the control store 30 and through a data path 79 to the main storage memory 12.

An M register 84 is shown to the right of registers 24 and 26 and is a general purpose 16-bit work register having its input connected by data path branch 86 to the output data path 87 of the ALU 28. The output of the M register 84 is connected by means of a data path 88 to an AND gate circuit 90 that represents sixteen individual AND gates, one for each of the 16 bits of the M register 84. The AND gate circuit 90 selectively gates the output of the M register 84 through a data path 92 to the right input 51 of the ALU 28. Thus, the M register 84 may be used as either a source register or a destination register for the ALU 28. One use for the M register 84 is to store data necessary to calculate the address in the main memory 12 of one end of an operand field.

Also connected to the output data path 87 of the ALU 28 are the registers 16, 20 and 24. The IB register 16 receives data from the ALU 28 through a data path branch 89, the SA-L1 register 20 selectively receives data from the ALU 28 through a data path branch 91, and the SB-L1 register 24 selectively receives data from the ALU 28 through a data path branch 93 and transmits data to the right ALU input 51 through the selector 74.

Referring now to the left side of FIG. 1, there is shown an IL register 95 and an IAR register 97, each of which receives data on the output data path 87 of the ALU 28 through data path branchs 99 and 94, respectively. The IL register 95 is a three-bit register which contains the byte length of the high level instruction being executed in the microprocessor. The IAR register 97 normally contains data for calculating the address of the next high level instruction to be executed in the microprocessor 14. The outputs of the IL register 95 and the IAR register 97 are selectively added in a summer 101, and the result is stored back in the IAR register 97. Also, the output of the IL register 95 may be applied to the left input 61 of the ALU 28 through a data path 98, and the output of the IAR register 97 is applied through a data path branch 100 to an AND gate circuit 102. The AND gate circuit 102 represents sixteen separate AND gates for selectively applying the output of the register 97 to the left input 61 and the ALU 28 through a data path branch 104.

Considering next a G register 106, this register is a collection of special control latches used to control various operations of the microprocessor 14. The condition of the zero bit position of G register 106 determines when instructions are retryable should an error occur in the microprocessor 14. Bit positions 4 and 6 of G register 106 are used as control signals to registers hereinafter described. The input of G register 106 is connected to the output data path 87 by a data path branch 108, and the output of the register 106 is applied through a data path branch 110 to an AND gate circuit 112. The AND gate circuit 112 represents eight independent AND gates for selectively gating the data in the G register 106 through a data path branch 114 to the left input 61 of the ALU 28.

Also connected to the output data path 87 of the ALU 28 by a data path 118 is an L register 116. This register normally stores the length of operands to be used during the execution of a particular high level instruction. The L register 116 may be used as an eight-bit register or as two independent four-bit registers. When used as two registers, the L register 116 may store two operands. The state of bit position six of the G register 106 is used to determine whether the L register 116 will be used as an eight-bit register or two four-bit registers. If bit position 6 of the G register 106 specifies that the L register 116 is used as two four-bit registers, an L2S latch 120 determines which of the two four-bit fields in the L register will be gated when the L register is selected as a source by a microinstruction. The output of the L register 116 is connected through a data path branch 122 to a selector 124. Selector 124 gates predetermined fields of the L register 116 through a data path branch 126 to the left input 61 of the ALU 28.

Another eight-bit register connected to the output data path 87 by a data path branch 130 is a P register 128. This register is primarily used to perform indirect addressing of a local storage array hereinafter described. The output of the P register 128 is applied through a data path branch 132 to a selector 134 that selects certain data fields from the P register and applies these data fields to the left input 61 through a data path branch 136.

A local store array 138, also connected to the output data 87, consists of 128 bytes of storage and is connected to the data path 87 through a data path branch 140. Each byte of the local store array 138 is individually addressable for reading and writing, and address data to the local store array is generated directly in a manner hereinafter described or indirectly using the P register 128. The highest order bit of an address to the array 138 is determined under certain conditions by the state of bit position four of the G register 106. The output of the local store array 138 is applied through a data path branch 142 to an AND gate circuit 144 that selectively applies data from the local store array to the left input 61 of the ALU 28 through a data path branch 146. Again, the AND gate circuit 144 represents a multiplicity of independent AND gates for gating data to the ALU 28.

The ALU 28 performs arithmetic or logical operations on data provided from the main memory 12. The above described registers that have outputs connected to either the input 51 or the input 61 may be selected as a data source for the ALU 28. Likewise, any register having an input connected to the output data path 87 may be a destination of data from the ALU.

Data from any two registers are selected for processing through the ALU by the microinstructions of the microprocessor 14. The ALU performs logical, decimal and binary arithmetic operations on bytes. The function of the ALU 28 may be specified directly in a microinstruction or indirectly by an F register 148 whose input is connected to the output of the ALU 28 by a data path branch 150. The F register 148 controls the operation of the ALU 28 through a signal applied to the ALU through a control line 152.

In addition to performing arithmetic and logical operations, the ALU 28 may be used as a data path. To perform this function, data received on either ALU input 51 or 61 is passed through the ALU 28 to the output data path 87. The ALU 28 is used as a data path to lower system cost by reducing the number of data paths necessary to achieve a selected capability or function.

Also connected to the ALU 28 is an 8-bit S register 154. S register 154 is connected to the output data path 87 of the ALU through a data path branch 156, and the output of the S register is connected through a data path branch 158 to the left input 61. The S register 154 contains ALU condition codes and temporary microprogram flags. ALU condition codes are applied to the S register 154 from the ALU 28 on control line 160. Bits 0–3 of the S register 154 are normally used for flags and bits 4–7 are normally used for the ALU condition codes.

The microprogram can branch on each of the bits in the S register 154.

In response to data received from various parts of the microprocessor 14, next address logic 162, connected to the data path 87 of the ALU 28 by means of a data path branch 161, builds a next address code which will subsequently be used to select the microinstruction in the control store 30 to be executed following the execution of a presently executing microinstruction. The output data of the next address logic 162 is applied to a 13-bit control store address register 164 through control lines 165. The address loaded into the address register 164 selects a microinstruction stored in the control store 30 which is loaded into a control store output register 166. The output register 166 is a 32-bit register, and each control word in the control store 30 is 32 bits in length. Separate or independent parts of the control store 30 operate at different speeds, thereby limiting the operating speed of the microprocessor 14 according to which part of the control store 30 is being used at a particular time. Also, as previously described, microinstructions may be transferred into the control store 30 from the main memory 12 through the registers 22 and 26.

Certain fields of the control store output register 166 are applied to the next address logic 162 through control lines 168 and to a microinstruction decode and control unit 170 through a data path 172. The control unit 170 generates FORMAT signals to the next address logic 162 through the control lines 174. The FORMAT signals transfer data to the next address logic 162 indicating the type or format of the microinstruction presently being executed. The next address code loaded into the address register 164 is selectively built in the next address logic 162 from data received on control lines 168 and 174 and on the data path branch 161.

The control unit 170 applies a CONTROL B signal on control line 176 to increment the value in the B register 82 causing the selector 74 to select the next byte to be gated from the SB-L1 register 24. When the selector 74 receives a control signal to gate data to the ALU 28, the selected byte in register 24 will be gated to the ALU.

To effect this data transfer, a RIGHT ALU SOURCE signal is produced on control lines 178 to gate data from a selected register to the right input 51 of the ALU 28. The RIGHT ALU SOURCE signal will activate either the AND gate circuit 90, the selector 74 or the selector 46 to gate either the data from the M register 84, the SB-L1 register 24 of the IS register 18, respectively, to the right input 51 of the ALU 28. It will be understood that only one register will be gated to the right input 51 at any one time.

The control unit 170 also generates a CONTROL I signal on control line 180 for incrementing the value in the I register 52. This incrementation causes the selector 46 to point or select to the next byte in the IS register 18 in the same manner as described in regard to B register 82. A DIRECT ALU FUNCTION signal is produced on control lines 182 by the control unit 170 to determine the arithmetical logical function of the ALU 28. One function that may be chosen by the DIRECT ALU FUNCTION signal is that the ALU 28 performs the function specified in the F register 148. Thus, the DIRECT ALU FUNCTION signal may directly specify the function of the ALU 28 or indirectly specify the function through the F register 148. CONTROL WORD EMIT signals are produced on the data path 184 by the control unit 170 and are applied to the left input 61 of the ALU 28. The ALU 28 passes the CONTROL WORD EMIT signals to the output data path 87 and loads the F register 148 through the data path branch 150. In this manner, the F register 148 is conditioned by the control unit 70 for controlling the function of the ALU 28.

Also produced by the control unit 170 on a control line 186 is a CONTROL A signal for incrementing the value in the A register 64. In response to being incremented, the A register 28 causes the selector 58 to point to or select the next byte in the SA-L1 register 20. The selected byte will be gated to the left input 61 of the ALU 28 when the selector 58 is activated. On control lines 188, the control unit 170 produces an S REGISTER EMIT signal which loads bits 0-3 in the S register 154. DIRECT LSR ADDRESS signals are produced on control lines 190 to directly address the local store array 138. A CONTROL L2S LATCH signal produced on control line 192 is applied to the L2S latch 120 to control the state of this latch.

CONTROL G REGISTER BIT signals are produced on control lines 194 by the control unit 170 to determine the state of bits at the positions zero, four and six of the G register 106. An INCREMENT IAR signal is produced on control line 196 which is applied to the summer 101 causing the data in the IL register 95 to be added to the data in the IAR register 97 and transferring the result to the IAR register.

The control unit 170 produces LEFT ALU SOURCE signals on control lines 198 to gate the data of one of the system registers to the left input 61 of the ALU 28. As with the right input 51, only one register may be gated to the left input 61 at a time. The LEFT ALU SOURCE signals are applied to either the AND gates 102, 112, or 144 or the selectors 124, 134 or 58. In this configuration, the control unit 170 will gate data to the left input 61 of the ALU 28 from one of the following: the IAR register 97, the G register 106, the L register 116, the P register 128, the local store array 138 or the SA-L1 register 20.

STORAGE COMMANDS are applied from the control unit 170 through control lines 200 to the virtual address translator 10. Such STORAGE COMMANDS control the fetching of high level instructions, operands and other data from the main memory 12 for use in the microprocessor 14.

It will be appreciated that the operation of the microprocessor 14 is primarily controlled by the microinstructions from control store 30 which are decoded in the microinstruction decode and control unit 170. This control unit 170 is a logic unit constituting an important part of the present invention and providing for inexpensive, efficient and flexible operation of the microprocessor 14. That portion of the microinstruction decode and control unit 170 that is pertinent to the present invention will hereinafter be described in greater detail in conjunction with the figures following FIG. 1.

A timing unit 202 provides C1 and C2 CLOCK signals on line 204 with the C2 clock being displaced in time with respect to the C1 clock. The timing unit 202 also produces a FIRST HALF-CYCLE signal on control line 206 which is connected to the control unit 170. In the execution of certain microinstructions, it may be desirable to use the same data path or control lines twice during the execution of a single microinstruction. The selected data path will be used for one function during the first half of the microinstruction execution cycle, and for a second purpose during the last half of the microinstruction execution cycle. The FIRST HALF-CYCLE signal indicates the end of the first half-cycle to the control unit 170 to facilitate the use of one data path or control line for two separate purposes or functions during one execution cycle.

A SHORT CYCLE signal from the control unit 170 is applied to the timing unit 202 through control line 208 to indicate that the particular microinstruction being executed has a short execution cycle relative to the execution cycle of microinstructions designated as normal. In response to the SHORT CYCLE signal, the timing unit 202 produces fewer timing clocks per execution cycle. The next address logic 162 applies a SLOW control store (C.S.) signal to the timing unit 202 on control line 210. This SLOW C.S. signal causes the timing unit to produce more timing clocks per execution cycle. It is necessary to produce this longer cycle when microinstructions are being fetched from a slower segment of control store 30.

Two additional control signals generated by the timing unit 202 are a LOAD CSOR signal for sequencing the output register 166, and a CARD SELECT signal connected to the control store 30.

In response to signals received from the control unit 170, the timing unit 202, the virtual address translator 10, and the main memory 12, a main store interface control 212 generates a holdoff signal to control the execution of microinstructions by the microprocessor 14. LOAD signals are also selectively produced on control lines 214 to cause the loading of data into the following: SA-L1 register 20, SA-L2 register 22, IB register 16, 35 IS register 18, SB-L1 register 24 and SB-L2 register 26. It will be appreciated that only one of the registers 20, 16 or 24 should be loaded with data from the main memory 12 at one time unless it is desired to load the same data into two or more registers. These registers 16, 20 and 24 share the same main data path 32 from the main memory 12 to the microprocessor 14. Likewise, only one of the registers 16, 20 and 24 should be loaded from the output data path 87 at one time unless it is desired to load the same data into two or more registers.

The main store interface control 212 receives STORAGE COMMANDS from the control unit 170 on lines 200 and receives DATA READY signals from the main memory 12 on the control lines 216. CONTROL signals are received by the interface control 212 on line 218 from the virtual address translator 10, and CLOCK signals, C1 and C2, are received on control line 204. The DATA READY signal indicates to the interface control 212 that data is ready at the output of the main memory 12 to be transferred to the microprocessor 14. The CONTROL signals on line 218 indicates which register 20, 16, or 24 that the data for main store 12 is to be loaded into. These CONTROL signals further indicate if the operation in process is a main store fetch or store.

The main store interface control 212 also receives a MAIN STORE ERROR signal on control line 220 from the OR gate 44. A MAIN STORE ERROR signal is produced when invalid data is detected by parity check circuit 56, 40 or 72. In response to the MAIN STORE ERROR signal, the interface control 212 will inhibit the microprocessor 14 from operating if it attempts to use the erroneous data. Finally, the main store interface control 212 produces a HOLDOFF signal on control line 222 which is connected to the timing unit 202. The HOLDOFF signal will cause the timing unit 202 to suspend the generation of clock timing signals for microinstruction execution.

Figure 2:
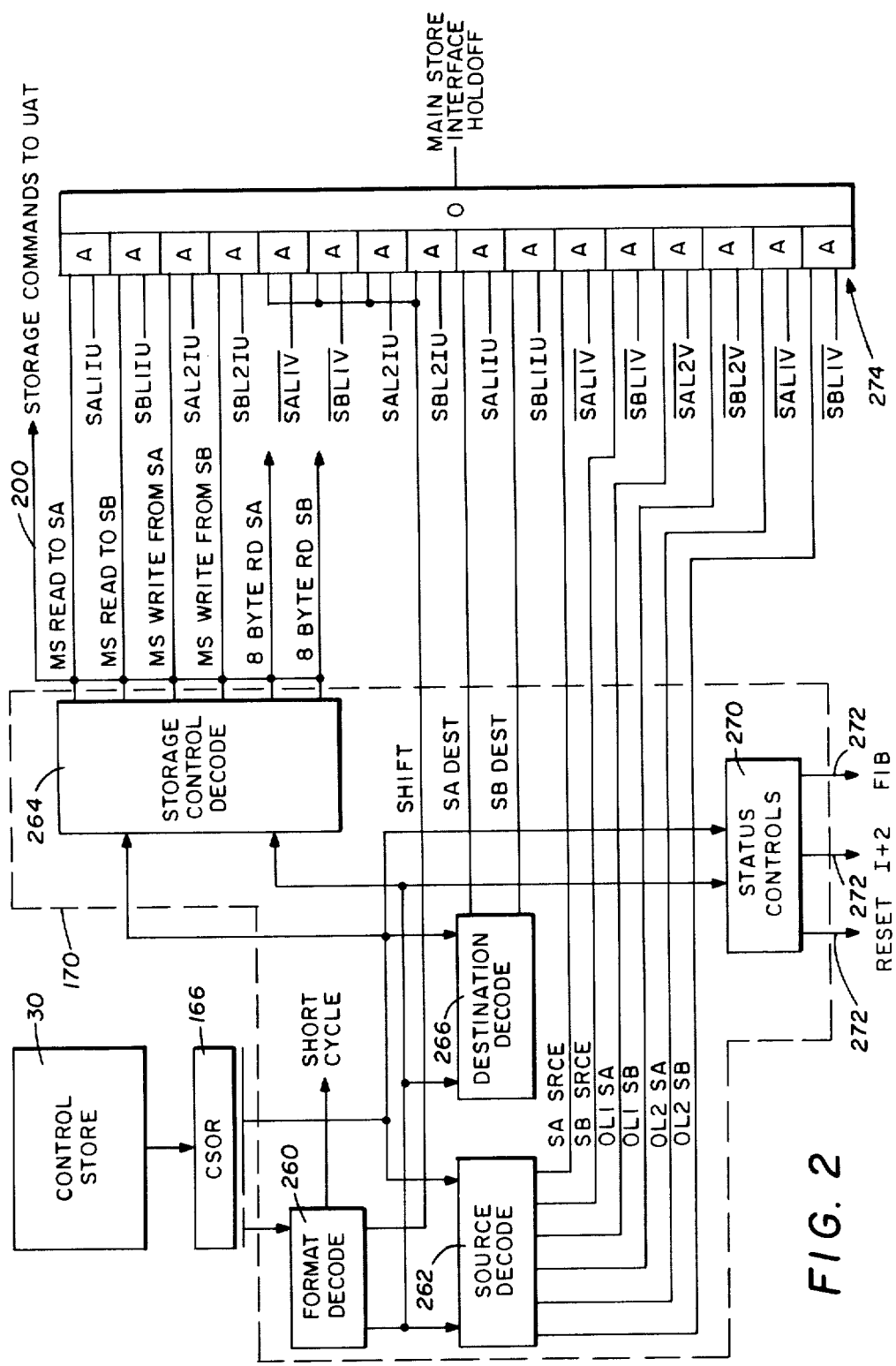
FIG. 2 is a block diagram of decode logic responsive to instruction codes and generating source and destination control signals and read/write commands.

Referring to FIG. 2, there is shown that part of the microinstruction decode annd control unit 170 for interfacing the operation of the main memory 12, having an operating cycle at a first rate, and the central processing unit (microprocessor) 14 operating at a second faster rate. Certain fields from the control store output register 166 as applied to the control unit 170 are input to format decode logic 260, source decode logic 262, destination decode logic 266, storage control decode logic 264 and status control logic 270. The logic 260, 262, 264, 266 and 270 comprises a series of interconnected AND gates for decoding microinstructions accessed into the control store output register 166. These microinstructions comprise 32 bits with the first three bits of the field applied to the format decode logic 160 and bits 13–31 (storage command and address bits) applied to the source decode logic 262, the storage control decode logic 264 and the status control logic 270. Other microinstructions transferred through the control store output register 166 includes source and destination instructions applied to the same logic.

The three-bit field that is decoded in the format decode logic 260 is applied to the source decode logic 262, the storage control decode logic 264, the destination decode logic 266 and the status control logic 270. Also, output from the format decode logic 260 is a shift control signal on line 268. The SHIFT microinstruction causes the contents of SA register 20 and 22 and SB registers 24 and 26 to be altered. The bit field connected to the status control logic 270 is decoded as control signals on lines 272. For the present invention, only the reset control signal (RESET) is of interest.

Microinstructions and format codes input to the source decode logic 262 are decoded into the control signals for establishing the operation of the SA registers 20 and 22 and the SB registers 24 and 26. Each of the control lines from the source decode logic 262 are input to one gate of an AND array 274 which comprises a part of the main storage interface control 212.

Additional control signals applied to gates of the AND gate array 274 are generated at the output of the destination decode logic 266 that decodes microinstructions from the output register 166 and format signals from the format decode logic 260. The control signals from the destination decode logic 266 establish the destination of data and microinstructions from the main memory 12 into either the SA-L1 register 20 or the SB-L1 register 24.

Storage command instructions from the output register 166 are decoded in the storage control decode logic 264 into FETCH (read) and STORE (write) commands generated on the line 200 to the interface control 212 and the virtual address translator 10. Fetch and store commands at the output of the storage control decode logic 264 are also applied to gates of the AND gate array 274. In addition to the fetch and store commands, the storage control decode logic 264 also generates commands to identify when data having an 8-byte length is transferred from the main memory 12 to the SA-L1 register 20 or the SB-L1 register 24.

In addition to control signals and commands from the logic 262, 264 and 266, each gate of the AND gate array 274 also receives an interlock latch for enabling a particular one or pattern of gates in the AND gate array 274. These interlock latches are generated by logic in the main store interface control 212 as detailed in FIGS. 3 and 4.

Figure 3:
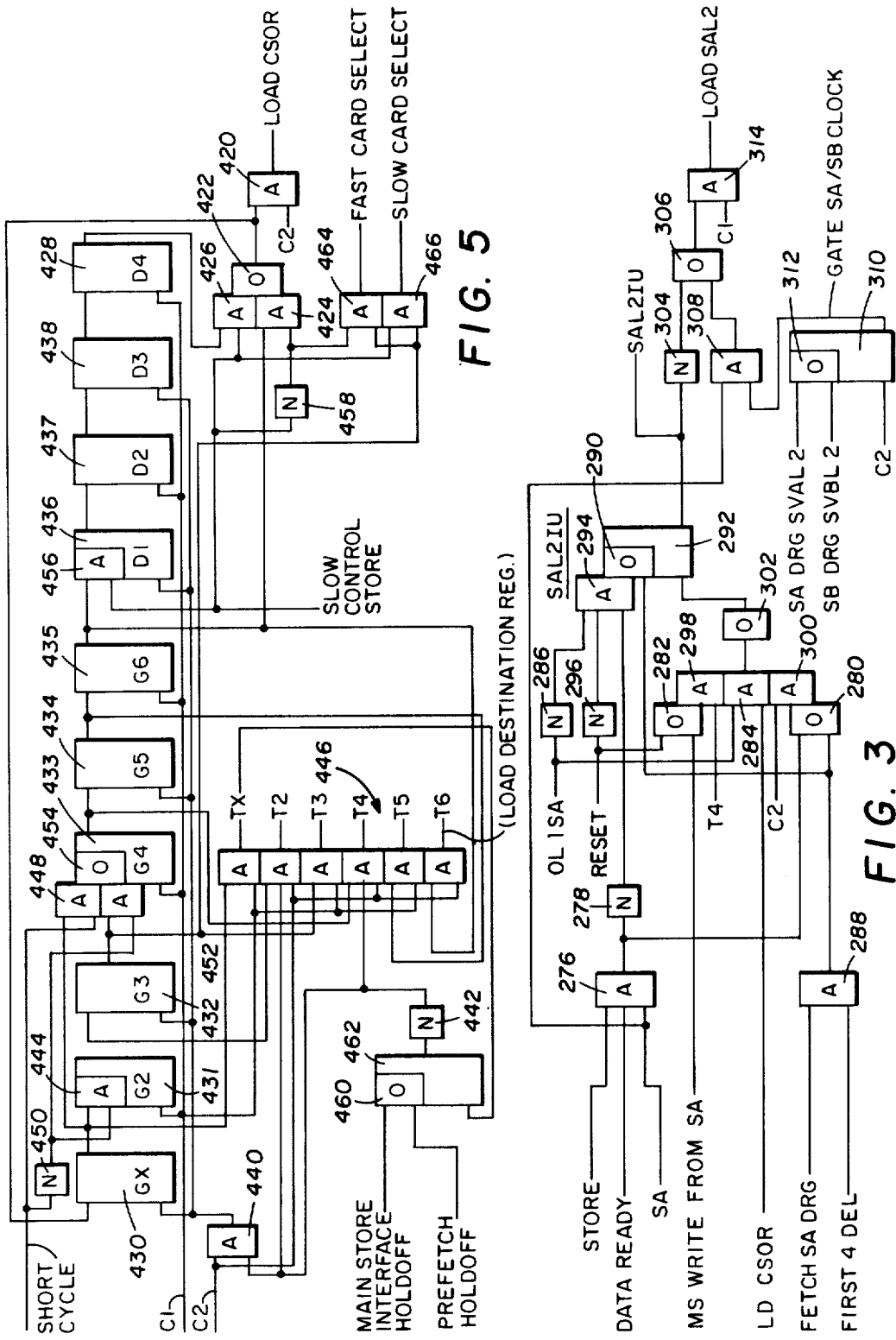
FIG. 3 is a block diagram of interlock logic for generating interlocks and load signals for interlocking the operation of the central processing unit to the operation of the main storage memory.

Referring to FIG. 3, there is shown the logic of the interface control 212 for generating interlock latch and load signals for the SA-L2 register 22. Three input controls to the logic of FIG. 3 are combined in AND gate 276 having an ouput applied to an inverter 278 and to an OR gate 280. The three inputs to the AND gate 276 include a STORE and SA signals from Virtual Address Translator 10 on line 218 and the DATA READY signal from the main memory 12 on line 216. The STORE and the SA signals on line 218 indicate that the operation in progress is a main memory store from SA-L2 register 22. The DATA READY signal is used to indicate the completion of the main memory operation. An additional input to the logic of FIG. 3 is a MS WRITE FROM SA command applied to an OR gate 282 which command is generated by the storage control decode logic 264. When generated by the source decode logic 262 an OL1 SA control signal appears at the input of an AND gate 284 and inverter 286. A second input to the AND gate 284 is the LD CSOR timing signal from the timing unit 202. Connected to inputs of an AND gate 288 is a FETCH SA DATA READY GATE (hereinafter DRG) signal and a signal indicating that the first four bytes of an 8-byte command are being fetched to the SA-L1 register 20. These two signals are ANDed and applied to a second input of the OR gate 280 and also applied to an input of an OR gate 290 as part of a latch 292. A second input to the OR gate 290 is the output of an AND gate 294 that receives one input from the inverter 286 and a second input from an inverter 296 which receives a RESET command from the status control logic 270. This RESET command is also tied to a second input of the OR gate 282.

An output of the OR gate 282 is applied to one input of an AND gate 298 having a second input receiving a microprocessor clock T4. An output of the OR gate 280 is applied to one input of an AND gate 300 having a second input receiving the C2 clock from the timing unit 202.

Outputs from each of the AND gates 284, 298 and 300 are input to an OR gate 302 having output connected to the clock terminal of the latch 292.

When either input to the OR gate 290 of the latch 292 is satisfied, the output of the latch steps to the logic level of the inputs which output is the interlock latch SA-L2 IU. This latch is set to indicate that register 22 is in use. The latch is applied to multiple gates of the AND gate array 274 as identified in FIG. 2. In accordance with accepted terminology, a latch is said to be "set" when placed in a logical "1" condition. A latch is "reset" when placed in (forced to) a logical "0".

The output of the latch 292 is also applied to an inverter 304 having an output connected to one input of an OR gate 306. A second input to the OR gate 306 is the output of an AND gate 308 having one input connected to the SA control signal from Virtual Address Translator 10 and a second input connected to the output of a latch 310. The latch 310 is set by the output of an OR gate 312 that receives two input control signals, that is, the control signals SA DRG SVAL 2 and SB SVBL 2. The latch 310 is toggled by the C2 clock from the timing unit 202. The output of the latch 310 is used for gating a clock to either the SA-L2 register 22 or the SB-L2 register 26.

Connected to the output of the OR gate 306 is one input of an AND gate 314 having a second input tied to the C1 clock from the timing unit 202. An output of an AND gate 314 is a load pulse for the SA-L2 register 22. Thus, the logic off FIG. 3 generates the interlock latch SA-L2 IU for an in use condition of the SA-L2 register 22 and also generates the load pulse for SA-L2 register 22.

To provide the same signals for the SB-L2 register 26, the main store interface control 212 includes a second logic circuit similar to that as shown in FIG. 3, except that the latch 310 is common to both circuits. This logic circuit for the SB-L2 register 26 receives the same inputs except for those signals which are identified with the letters "SA". Instead, inputs to the logic for the SB-L2 register 26 are identified with the letters "SB". For example, the OL 1 SA control signal is replaced by the control signal OL 1 SB as applied to the inverter 286 and the AND gate 284. The logic for the SB-L2 register 26 generates the interlock latch SB-L2 IU thereby identifying that the register 26 is in use. This latch is applied to several gates of the AND gate array 274. A second output is a LOAD SB-L2 signal that would be input to the register 26 over the control lines 214.

Figure 4:
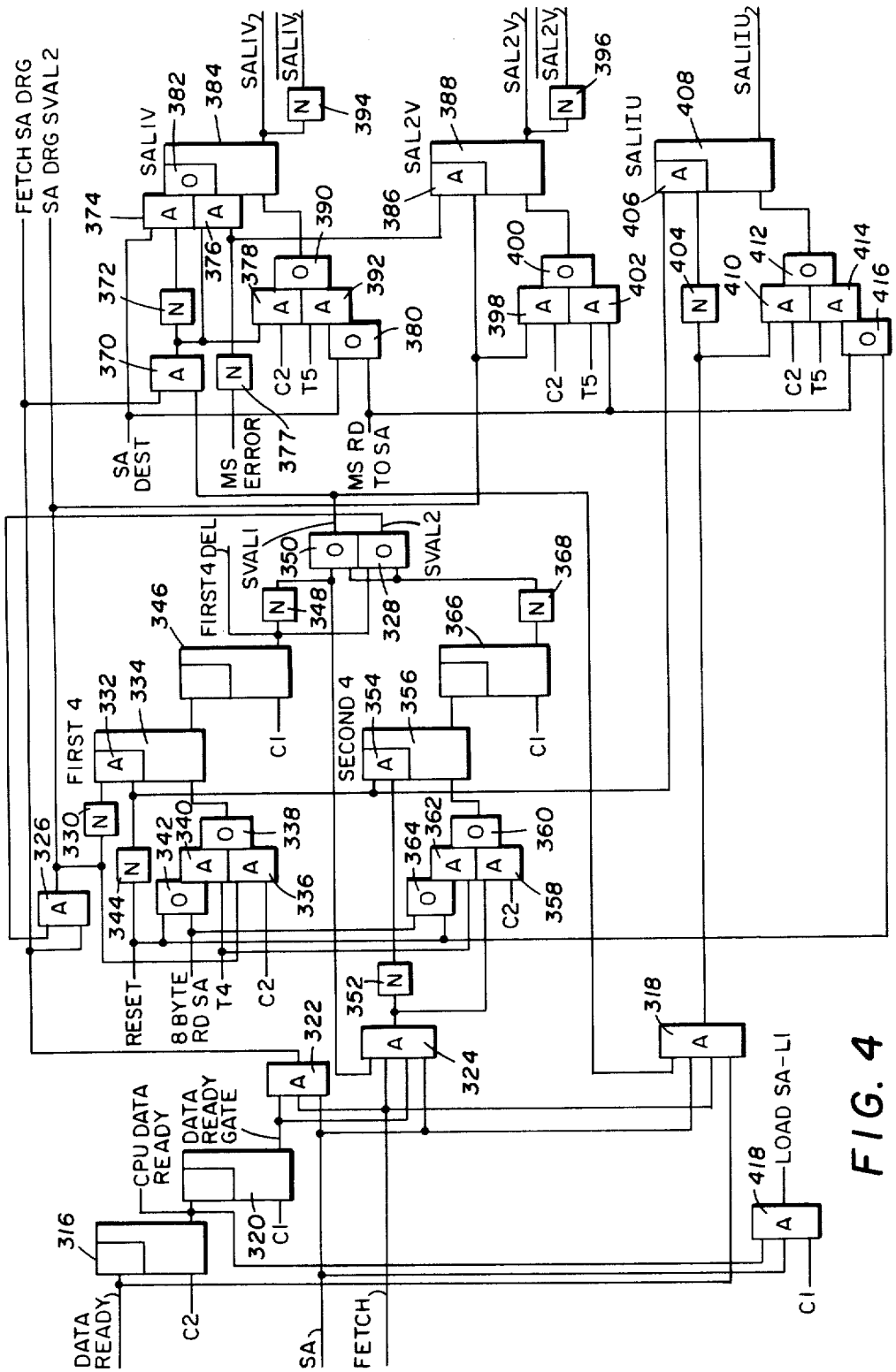
FIG. 4 is a block diagram of interlock logic for generating valid data interlocks and register-in-use interlocks as further interface control between the operation of the central processing unit and main storage memory.

Referring to FIG. 4, there is shown logic for generating additional interlock latches to the AND gates of the array 274. The circuitry of FIG. 4 provides the interlock latches for the SA-L1 register 20 and the SA-L2 register 22 with the identical logic being available in the main store interface control 212 for generating interlock latches for SB-L1 register 24 and the SB-L2 register 26.

One input to the logic of FIG. 4 is the DATA READY command from the main memory 12 applied to the input of a latch 316. This DATA READY signal is also one input to an AND gate 318. The clock terminal of the latch 316 receives the C2 clock on the line 204 from the timing unit 202. The output of the latch 316 is the central processing unit (CPU) DATA READY signal that is input to a latch 320 having the clock terminal receiving the C1 clock from the timing unit 202. The output of the latch 320 is a DATA READY GATE applied to one input of an AND gates 322 and 324. A second input to the AND gate 322 is the SA CONTROL signal from the Virtual Address Translator 10 with its signal also applied to one input of an AND gates 318 and 324. A third input to the AND gate 322 is a FETCH control signal from Virtual Address Translator 10 and this signal is also applied to an input of AND gates 318 and 324.

The signals combined in the AND gate 322 are output as the FETCH SA DRG applied as one input to the AND gate 288 of FIG. 3. This signal is also applied to one input of an AND gate 326 having a second input tied to the output of an OR gate 328. The output of the AND gate 326 is the SA DRG SVAL 2 signal applied to the OR gate 312 (FIG. 3). This output of the AND gate 326 is also applied through an inverter 330 to one input of an AND gate 332 that is part of a latch 334. In addition, the output of the AND gate 326 is input to an AND gate 336 that has a second input receiving the C2 clock from the timing unit 202. An output of the AND gate 336 is one input to an OR gate 338 having a second input tied to the output of an AND gate 340. An output of the OR gate 338 is tied to the clock terminal of the latch 334.

Connected to one input of the AND gate 340 is a T4 microprocessor clock and the second input is tied to the output of an OR gate 342. One input of the OR gate 342 is an 8-byte READ (fetch) SA command from the control decode logic 264 and a second input is the RESET signal from the status control logic 270. This RESET signal is also applied through an inverter 344 to one input of the AND gate 332.

Tied to the output of the latch 334 is a latch 346 that also receives the C1 clock from the timing unit 202. When set, the output of the latch 346 indicates that the first four bytes of an 8-byte data transfer from main memory 12 have not yet been received at the SA-L1 register 20. This signal is also coupled through an inverter 348 to an OR gate 350 and applied directly to one input of the OR gate 328. The output of the inverter 348 is also connected to one input of the AND gate 324.

The output of the gate 324 is connected through an inverter 352 to one input of an AND gate 354 as part of a latch 356. The output of the gate 324 is also applied to one input of an AND gate 358 having a second input receiving the C2 clock from the timing unit 202. Connected to the output of the AND gate 358 is an OR gate 360 having a second input tied to the output of an AND gate 362. One input to the AND gate 362 is the T4 microprocessor clock and a second input is tied to the output of an OR gate 364. Connected to one input of the OR gate 364 is the 8-byte READ SA command from the control decode logic 264 and a second input is the RESET signal from the status control logic 270.

An output of the OR gate 360 connects to the clock terminal of the latch 356; this latch is set during an 8-byte transfer from the main memory 12 to the SA registers 20 and 22. An output of the latch 356 is applied to a latch 366 that also receives the C1 clock from the timing unit 202. The output of the latch 366 is applied through an inverter 368 to one input of the OR gate 328 and to one input of the OR gate 350. As previously explained, the output of the OR gate 328 is a second input to the AND gate 326.

Connected to the output of the OR gate 350 is one input of an AND gate 370 and one input of the AND gate 318. A second input to the AND gate 370 is the FETCH SA DRG signal from the output of the AND gate 322. The output of the AND gate 370 is applied through an inverter 372 to one input of an AND gate 374. The output of the AND gate 370 is also directly applied to one input of an AND gate 376 and one input of an AND gate 378. A second input to the AND gate 374 is the SA DEST signal from the destination decode logic 266 which signal is also applied to one input of an OR gate 380. The output of the AND gate 374 connects one input of an OR gate 382 of a latch 384. A second input to the OR gate 382 is the output of the AND gate 376 that receives an output from inverter 377 which has as input the MAIN STORE ERROR signal from the OR gate 44 on the line 220. The output of inverter 377 signal is also applied to one input of an AND gate 386 of a latch 388.

Connected to a second input of the AND gate 378 is the C2 clock from the timing unit 202. This AND gate has an output coupled to one input of an OR gate 390 that has a second input connected to the output of an AND gate 392. One input of the AND gate 392 is the output of the OR gate 380 and a second input is a T5 microprocessor clock. As mentioned, one input to the OR gate 380 is the SA DEST signal from the decode logic 266. A second input to the OR gate 380 is the MS READ TO SA command from the storage control decode logic 264.

The output of the OR gate 390 connects to the clock terminal of the signal 384. This latch generates the interlock signal SAL1V which is inverted by an inverter 394 to generate the interlock signal NOT SAL1V. The interlock latch SAL1V is set when valid data has been transferred into the SA-L1 register 20. The interlock signal NOT SAL1V is active when the SAL1V latch is reset indicating that the main store fetch has not completed or that it has completed and the data contained errors. Check circuit 56 provides an error signal to the OR gate 44. The interlock signal NOT SAL1V is applied to gates of the AND gate array 274.

Valid data interlock signals for the SA-L2 register 22 are generated at the output of the latch 388. This latch generates the interlock signal SAL2V which is applied through an inverter 396 to provide the interlock signal NOT SAL2V. To generate the interlock signal at the output of the latch 388, a second input to the AND gate 386 is the SA SVAL2 signal at the output of the AND gate 326. This signal is also applied to one input of an AND gate 398 that has a second input receiving the C2 clock from the timing unit 202. The output of the AND gate 398 is tied to one input of an OR gate 400 which has an output tied to the clock terminal of the latch 388 and a second input connected to the output of an AND gate 402. Input to the AND gate 402 is the MS RD TO SA command from the storage control decode logic 264 and the T5 microprocessor clock.

Connected to the output of the AND gate 318 through an inverter 404 is one input of an AND gate 406 of a latch 408. A second input to the AND gate 406 is the output of the inverter 344. The output of the AND gate 318 is also connected to one input of an AND gate 410 having a second input receiving the C2 clock from the timing unit 202. The output of the AND gate 410 is applied to one input of an OR gate 412 that has a second input connected to the output of an AND gate 414. The AND gate 414 receives the T5 microprocessor clock at one input and has a second input connected to the output of an OR gate 416. Connected to one input of the OR gate 416 is the MS RD TO SA command from the decode logic 264 and connected to a second input is the RESET signal from the status control logic 278.

An output of the OR gate 412 connects to the clock terminal of the latch 408. When set, the latch 408 generates the interlock signal SAL1IU. This latch is set when the SA-L1 register 20 is in use, that is, during a reading (fetching) of data into this register.

Additional logic of FIG. 4 includes the AND gate 418 having one input receiving the C1 clock from the timing unit 202, a second input connected to receive the FETCH signal and a third input connected to the output of the latch 316. The output of the AND gate 418 is a LOAD SA-L1 pulse to load data into the SA-L1 register 20.

Logic as illustrated in FIG. 4 provides various interlock latch and control signals for operation of the SA-L1 register 20 and the SA-L2 register 22. Similar logic is provided in the main store interface control 212 to generate interlock latches and control signals for operation of the SB-L1 register 24 and the SB-L2 register 26. For the logic identified with the SB registers, those inputs containing the letters "SA" are replaced with inputs identified with the letters "SB". For example, the MS RD TO SA command to the OR gate 380, the AND gate 402, and the OR gate 416 would be replaced with the MS RD TO SB command from the storage decode logic 264. Logic for the SB-L1 register 24 and the SB-L2 register 26 will generate the FETCH SB DRG, the SB DRG SVAL2 to the OR gate 312, the interlock latches SBL1V and SBL2V, and the in use latch SBL1IU to the gates of the AND gate array 274. The AND gate 418 of the logic for the SB-L1 register 20 outputs the LOAD SB-L1 pulse.

Referring again to FIG. 2, any time the two inputs of any of the gates of the AND gate array 274 are set, the output of that gate will be set, thereby generating a MAIN STORE INTERFACE HOLDOFF control signal. This HOLDOFF control signal is applied from the main store interface control 212 on the line 222 to the timing unit 202.

Referring to FIG. 5, there is shown that part of the logic of the timing unit 202 responsive to the MAIN STORE INTERFACE HOLDOFF control signal from the AND gate array 274. When this signal is applied to the logic of FIG. 5 at the next TX clock, the execution of microinstructions by microprocessor 14 will be suspended. By this action of the logic of FIG. 5, the operation of the microprocessor 14 is controlled to function at a rate compatible with the operation of the main store 12. When inhibited from operating with the main store 12, the microprocessor 14 is, however, enabled to perform other microinstructions.

One output of the logic of FIG. 5 is a LOAD CSOR command applied to the control store output register 166. This command is generated at the output of an AND gate 420. One input of the AND gate 420 is the C2 clock and a second input is the output of an OR gate 422. The OR gate 422 has one input connected to an AND gate 424 and a second input connected to an AND gate 426. One input to the AND gate 426 is a SLOW CONTROL STORE signal and a second input is the output of a latch 428 that is the last latch in a clock ring that includes latches 430 to 438.

Connected to the clock terminal of the latches 431, 433, 435, 437 and 428 is the C1 clock from the timing unit 202. Connected to the clock terminal of the latches 430, 432, 434, 436 and 438 is the output of an AND gate 440. One input to the AND gate 440 is the C2 clock from the timing unit 202 and a second input is the output of an inverter 442.

The input of the latch 430 is connected to the output of the OR gate 422. The output of this latch connects to the input of an AND gate 444 as part of the latch 431 and also connects to one input of a gate of an AND gate array 446. The AND gate array 446 generates the microprocessor clocks TX, T2, T3, T4, T5 and T6. The function of these clock signals will be explained.

Also connected to the output of the latch 430 is one input of an AND gate 448 that has a second input receiving the SHORT CYCLE control signal from the output of the format decode logic 260. This SHORT CYCLE control signal is also applied through an inverter 450 to the second input of the AND gate 444 and to one input of an AND gate 452. A second input to the AND gate 452 is the output of the latch 432 that is also connected to a gate of the AND gate array 446. Another gate of the AND gate array 446 is also connected to the output of the latch 431. Connected to the output of the AND gates 448 and 452 is an OR gate 454 as part of the latch 433.

Outputs of the latches 433, 434, and 435 are timing controls and are applied as an input to one of the gates of the AND gate array 446. The output of the latch 435 is also connected to a second input of the AND gate 424 and an input of an AND gate 456 as part of the latch 436. A second input to the AND gate 456 is the SLOW CONTROL STORE signal from next address logic 162. Latches 436, 437, 438 and 428 are interconnected as a part of the clock ring with the output of the latch 428 applied to one input of the AND gate 426. Latches 428 and 436–438 provide a delayed gate to the AND gate 426 when the slow segment of control store 30 is being accessed. As explained, the output of this AND gate along with the output of an AND gate 424 connects to the OR gate 422. A second input to the AND gate 424 is the output of an inverter 458 that has an input connected to receive the SLOW CONTROL STORE signal.

Microprocessor clocks T2–T6 and the LOAD CSOR pulse are output from the AND gate array 446 and AND gate 420 so long as the MAIN STORE INTERFACE HOLDOFF is not set at the output of one of the gates of the AND gate 274. The outputs of each of the gates of the array 274 are connected to one input of an OR gate 460 as part of a latch 462. A second input to the OR gate 460 is a PREFETCH HOLDOFF for anotherr operation of the microprocessor 14 that controls the interfacing with the main memory 12. The clock terminal of the latch 462 is connected to the TX microprocessor timing pulse from the AND gate array 446. An output of the latch 462 is applied through the inverter 442 to the AND gate 440 and to selected gates of the AND gate array 446.

When the output of the latch 462 is set, the AND gate 440 will be disabled, thereby blocking the C2 clock from sequencing of the latches 428, 430, 432, 434, 436 and 438. This inhibits the AND gate 420 and AND gate array 446 from generating the LOAD CSOR pulse and the microprocessor clocks T2–T6.

Also included as part of the logic of FIG. 5 are AND gates 464 and 466 which generate, respectively, a FAST CARD SELECT control and a SLOW CARD SELECT control to the control store 30. Input to the AND gate 464 is the output of the inverter 458 and the G3 timing signal from the output of the latch 432. The G3 timing signal is also input to the AND gate 466 that includes a second input connected to the SLOW CONTROL STORE signal.

Operation of the logic of FIGS. 2–5 to inhibit operation of the microprocessor 14 to force its operating rate to be compatible with the operating rate of the main memory 12 will be explained with reference to FIGS. 6–10. Reference timing for each of these figures is the C1 and C2 clocks from the timing unit 202. By means of these timing charts, representative examples of the operation of the logic will be explained. It should be understood, however, that these examples are not exhaustive of all the operating cycles of the logic of FIGS. 2–5 for controlling the operating rate of the microprocessor 14.

Referring to FIG. 6, at the first C1 clock the microprocessor 14 executes the microinstruction 470 which is an operation for storing from the SA-L2 register 22 to the main memory 12. This microinstruction is decoded in the storage control decode logic 264 to generate the storage command MS WRITE FROM SA connected to the virtual address translator 10 and also connected to a gate of the AND gate array 274. In addition, this command is also input to the OR gate 282 of FIG. 3, thereby setting up a condition to clock the latch 292. At the next occurrence of the T4 clock to the AND gate 298, the latch 292 is set to generate the interlock latch SAL2 IU (waveform 472) indicating that the SA-L2 register 22 is in use. Latch 292 sets because the inputs of inverters 286, 296 and 278 are all at a logical zero level when the microinstruction WRITE FROM SA is being executed. This enables the appropriate gate of the AND gate array 274 and the MAIN STORE INTERFACE HOLDOFF signal is applied to the OR gate 460. This conditions latch 462 to set although it will not be clocked until the next occurrence of the TX microprocessor clock from the AND gate array 446. This clock does not occur until the beginning of the next microinstruction cycle.

If the next microinstruction to the executed does not require the use of SA-L2 register 22, then before the next occurrence of the TX clock, the storage command MS WRITE FROM SA is removed from the output of the decode logic 264, thereby disabling the AND gate of the array 274 and the MAIN STORE INERFACE HOLDOFF signal is no longer input to the OR gate 460. Thus, the logic of FIG. 5 continues to step the microprocessor to the next microinstruction.

While the microinstruction at 470 is being executed, the next microinstruction to be executed is fetched at 474 and decoded in the decode and control unit 170 during a time interval 476. If this next microinstruction produces any command but the MS WRITE FROM SA or SHIFT, the microprocessor 14 will continue to operate and carry out the microinstruction. However, if the output of the decode logic 264 or 260, as a result of decoding, the microinstruction 474 generates the MS WRITE FROM SA or SHIFT COMMAND then one AND gate of the array 274 will be enabled and the MAIN STORE INTERFACE HOLDOFF signal will be applied to the OR gate 460. The first clock of the next microinstruction execution cycle, TX, will set holdoff latch 462 as shown in waveform 478. As explained, this will inhibit the generation of the microprocessor clocks T2-T6 and thereby prevent execution of the next microinstruction which would attempt to use SA-L2 register 22 while this register is still in use from a previous microinstruction.

This holdoff or inhibiting of the operation of the microprocessor 14 will take place if the next microinstruction 474 is either (1), a data store from the same register, or (2), a shift of data in the register. Both of these two microinstructions require the use of SA-L2, and therefore the logic of FIG. 5 will be activated to inhibit the operation of the microprocessor 14 by setting latch 292 to inhibit generation of microprocessor clock timing.

The holdoff or inhibiting of the microprocessor 14 continues until the DATA READY signal 480 is generated at the output of the main memory 12, indicating that the transfer as called for by the microinstruction 470 has been completed. This DATA READY signal which comes an unspecified time after the microinstruction that initiated the store operation is shown to occur at the C1 clock 481. This enables the latch 292 to be reset at the next C2 clock. At the next C2 clock, the interlock latch SAL2IU is removed from the AND gate array 274, thereby removing the MAIN STORE INTERFACE HOLDOFF to to OR gate 460. This enables the latch 462 to be reset by the next TX microprocessor clock which occurs at the next C1 clock applied to the AND gate array 446. The inhibit of the logic of FIG. 5 is removed, thereby returning the ring counter of the latches 428 and 430-438 to a normal operating cycle. The holdoff latch 462 is conditioned to set or reset at TX clock time. Thus, when latch 462 is set, latch 430, which is used to generate TX, is also set. This causes the frequency of TX to increase to that of C1 during the time the holdoff latch 462 is set. The increased frequency of TX allows the holdoff latch 462 to be sampled to detect the absence of the interlock condition and thereby resume microinstruction execution with minimal delay.

When the latch 292 is set to generate the interlock signal SAL2IU, the AND gate 314 of FIG. 3 is disabled, thereby blocking the C1 clocks to SA Register 22. Thus, the LOAD SAL2 CONTROL signal, as illustrated by the waveform 483 will not be generated during the time of the interlock latch SAL2IU 472. In this manner the present contents of SA-L2 register 22 are preserved until no longer required.

Referring to FIG. 7, there is shown a timing diagram when a microinstruction 484 initiates a 4-byte FETCH (read) from the main memory 12. This microinstruction is decoded by the logic of FIG. 2 to reset the latches 384 and 388 and set the latch 408 of FIG. 4. The latches 384 and 388 are reset when the microinstruction FETCH TO SA is executed since none of the data inputs to latches to 382 or 388 are conditioned when the T5 clock is applied to AND circuits 392 and 402. Latch 408 is set when the T5 clock is applied to latch 408 via AND circuit 414 because the data inputs to AND circuit 406 are satisfied. When latches 384 and 388 are reset, they indicate that the contents of SA registers 20 and 22 and considered invalid (or empty) because a new main store fetch is in process. The latches 384 and 388 will be set when error free data arrives from main store.

At the next occurrence of the C1 clock to the AND gate array 446, the T5 microprocessor clock resets latch 384, thereby generating the interlock signal NOT SAL1V 486 (an indication of invalid data) at the output from the inverter 394. Also, at this time, the latch 408 is set to generate the in use interlock signal SAL1IU as illustrated by the waveform 488. This triggers several gates of the AND gate array 274 to generate the MAIN STORE INTERFACE HOLDOFF signal to the OR gate 460. However, the latch 462 is not set until the next TX microprocessor clock is generated.

As explained with reference to FIG. 6, the next microinstruction is fetched and decoded to determine if a holdoff condition will be required.

When the previous microinstruction was a 4-byte fetch from the main memory 12, a number of subsequent microinstructions will require microinstruction execution to be suspended. If the next microinstruction calls for a fetch from the main memory to the SA-L1 register 20, then the signal MS READ TO SA will activate again and since SA-L1 register 20 is presently in use, the MAIN STORE INTERFACE HOLDOFF signal to the OR gate 460 will activate as previously explained. This signal will be sampled at the next TX clock and holdoff latch 462 will set. The holdoff condition as shown in waveform 490 is established to inhibit operation of the microprocessor 14 by degating the microprocessor clocks T2-T6. The holdoff condition 490 is also generated when a microinstruction following the instruction 484 specifies a shift function. Since the SHIFT microinstruction causes the SA registers 20 and 22 and SB registers 24 and 26 to be changed, it must not be allowed to execute while SA register 20 contains invalid data. (The data is said to be invalid because the data requested from main store 12 has not yet arrived.)

Additional microinstructions will also generate a holdoff situation, for example, if the data in the SA-L1 register 20 is selected for an operation in the ALU 28. This is decoded in the source decode logic 262, enabling a gate of the AND gate array 274 which has previously been enabled by the interlock latch NOT SAL1V from the latch 384. This causes the MAIN STORE INTERFACE HOLDOFF signal to be applied to the OR gate 460, producing the latch holdoff condition 492 thereby inhibiting the operation of the logic of FIG. 5 from generating microprocessor clock timing signals.

The holdoff condition 492 will also be generated if a next microinstruction following the instruction 484 calls for gating of data from the SA-L1 register 20 to control store 30. A third microinstruction which produces the holdoff condition 492 is an overlay instruction that when decoded by the source decode logic 262 generates the control signals OL1 SA and OL2 SA to the AND gate array 274. The contents of SA registers 20 and 22 must not be written into control store 30 by the overalay microinstruction until the contents are known to have arrived error free from main store 12 and be in SA registers 20 and 22.

Either the holdoff condition 490 or the holdoff condition 492 will continue until the main memory 12 generates the DATA READY signal 494 to the latch 316 and the AND gate 318 of FIG. 4. Then, at the next occurrence of the C2 clock applied to the AND gate 410 the latch 408 will be reset, thereby removing the interlock signal SAL1U from the AND gate array 274. The interlock signal NOT SAL1V, however, continues until the data ready gate 496 occurs at the output of the latch 320. This enables the latches 384 and 388 to be set at the next occurrence of the C2 clock to the AND gate 378 and 398 if the data from main store 12 is error free. At this time, all interlock latches to the AND gate array 274 are removed.

With the removal of the interlock latch in waveform 488 from the AND gate array 274, the latch 462 is conditioned to be reset at the next TX microprocessor clock which is generated at the next C1 clock. This removes the holdoff condition 490 and the microprocessor 14 is allowed to resume operation at its normal rate. However, for the holdoff condition 492, it is the interlock latch 486 that maintains the MAIN STORE INTERFACE HOLDOFF to the logic 460. Thus, the holdoff condition 492 continues until the latch 384 is set indicating error free data had been loaded in SA-L1 register 20. AND gate 418 is used to generate the LOAD SA-L1 pulse at 498 to load the main store data into SA-L1 register 20. Since latch 292 is not set, the data is copied into SA-L2 register 22 with the next C1 clock.

Figure 8:
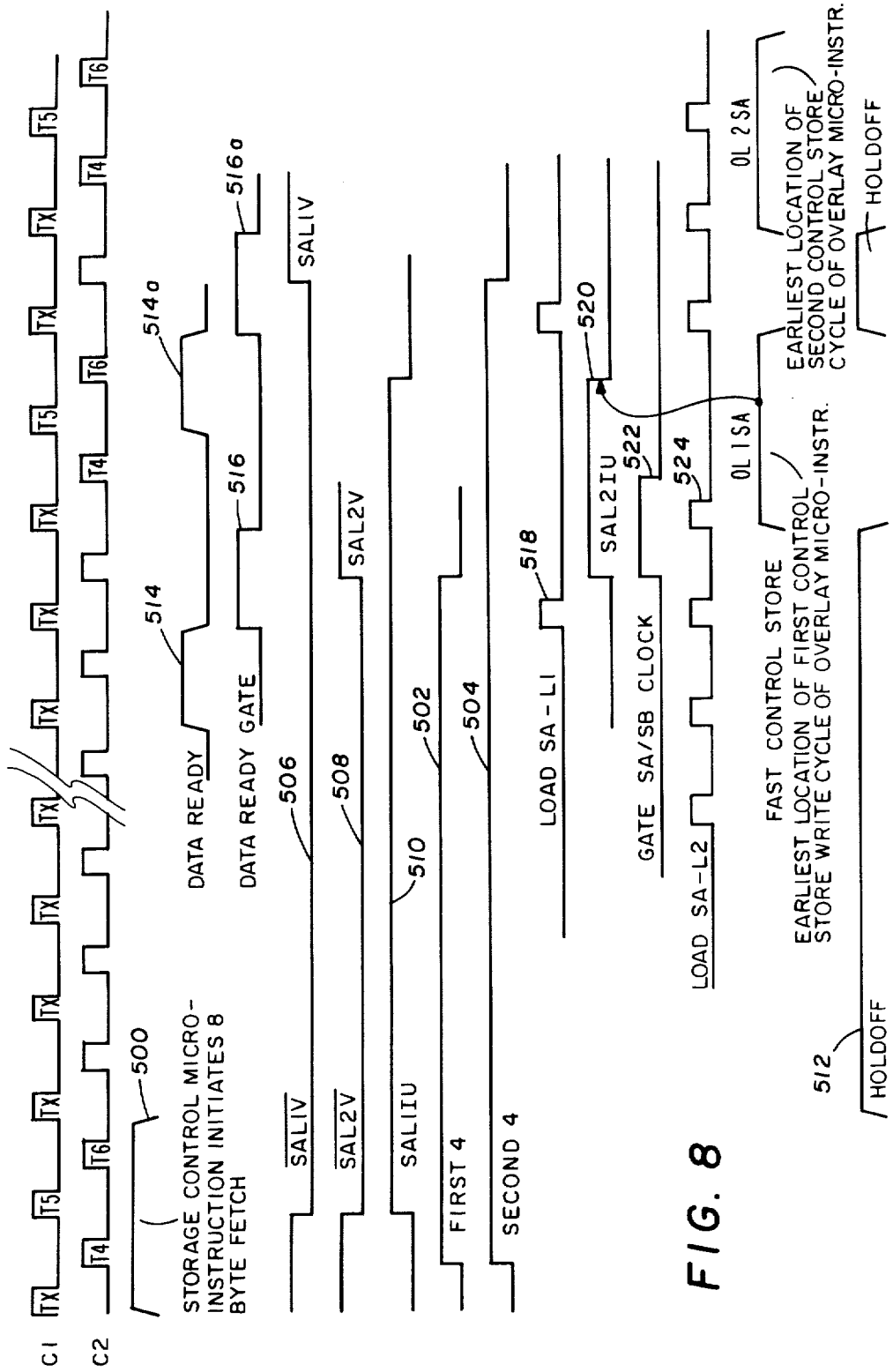

Referring to FIG. 8, there is illustrated the timing cycle when the microprocessor 14 executes the microinstruction which initates an 8-byte fetch from the main memory 12 to the SA register 20 and 22 for a normal operating mode. The microinstruction 500 is decoded in the logic of FIG. 2 to activate the signals MS READ TO SA and 8 BYTE RD TO SA. At the next T4 clock, the latches 334 and 356 are set, thereby generating the control gates shown by the waveforms 502 and 504 and thereby enabling latches 346 and 356 to be set. At the next T5 clock pulse, latches 382 and 388 are reset and latch 408 is set in the manner described with reference to FIG. 7 to generate the interlock latches shown by the waveforms 506, 508 and 510. These interlock latches are applied to one or more gates of the AND gate array 274. Subsequent microinstructions will be decoded as described with reference to FIG. 6 and a holdoff condition 512 will be generated by the logic of FIG. 5 whenever subsequent microinstructions require either the use of SA register 20 or valid data in SA registers 20 and 22 as has been described with reference to FIG. 6 and 7. All other microinstructions from the control store 30 will not inhibit the operation of the microprocessor 14.

When the DATA READY gate 514 is generated at the main memory 12, the DATA READY gate 516 will be generated at the next C1 clock at the output of the latch 320. This conditions latch 388 to be set and latch 334 to be reset at the next C2 clock applied to the AND gates 336 or 398, respectively. This is an indication that the first four bytes of the 8-byte fetch have been loaded into the SA-L1 register 20 at the LOAD SAL1 pulse 518. The data will be copied into SA register 22 at pulse 524, and latch 388 is set indicating valid data is present in SA register 22. The same C2 clock that sets the latches 388 and reset latch 332 also causes the latch 292 of FIG. 3 to be set, thereby generating the interlock latch SAL2IU, as identified by the waveform 520. At the same time, the SA/SB clock is generated at the output of the latch 31v allowing one additional LOAD SAL2 pulse to be generated during this time interval. This pulse copies the data in SA register 20 into SA register 22. Since the SA/SB clock 522 is removed at the next occurrence of a C2 clock, no additional LOAD SAL2 pulses will be generated until the latch 292 is reset.

When latch 388 is set, the interlock condition NOT SAL2V is removed from AND gate array 274. Overlay microinstruction cycle one can be executed as shown in FIG. 8. This microinstruction causes the contents of SA-L2 register 22 to be written into control store 30 and it causes latch 292 to be reset as shown at 520 in FIG. 8. If the second four bytes from main store have not arrived before overlay microinstruction cycle two begins, holdoff is set again due to the NOT SAL1V interlock signal. When the next DATA READY pulse 514a is generated at the output of main memory 12, latch 408 and latch 356 of FIG. 4 are conditioned to be reset. At the next C2 clock, latch 408 is reset, thereby removing the interlock latch SAL1U signal from the AND gate array 274. The LOAD SAL1 pulse is generated to transfer the second four bytes from main store 12 into SA-L1 register 20. If the latch 292 is still set, this data, the second four bytes from main store 12, is not copied into SA-L2 register 22. If the first overlay cycle has occurred to reset latch 292, the second four bytes will be copied into SA-L2 register 22. At the next DATA READY GATE 516a, the latch 356 is conditioned to be reset and, when reset, enables the resetting of latch 366. Simultaneously, latch 384 is set indicating SA-L1 register 20 contains valid data. Thus, when completing an 8-byte fetch from main memory 12, the first four bytes are loaded into SA-L1 register 20 and then transferred to SA-L2 register 22 at which time the second four bytes will be transferred into SA-L1 register 20. The second four bytes will be copied into SA-L2 register 22 after the first four bytes have been written to control store by overlay microinstruction cycle one. Subsequently, the second four bytes are written to control store by the microinstruction, overlay cycle two.

The example of FIG. 8 was for an 8-byte fetch for a fast control store which is the normal operation of the logic of FIG. 5. When the overlay microinstruction from the control store 30 is decoded by next address logic 162 and this indicates that the address to be written in control store 30 lies in the slow segment. The ring counter latches of FIG. 5 are reconfigured to provide additional processing time.

Figure 9:
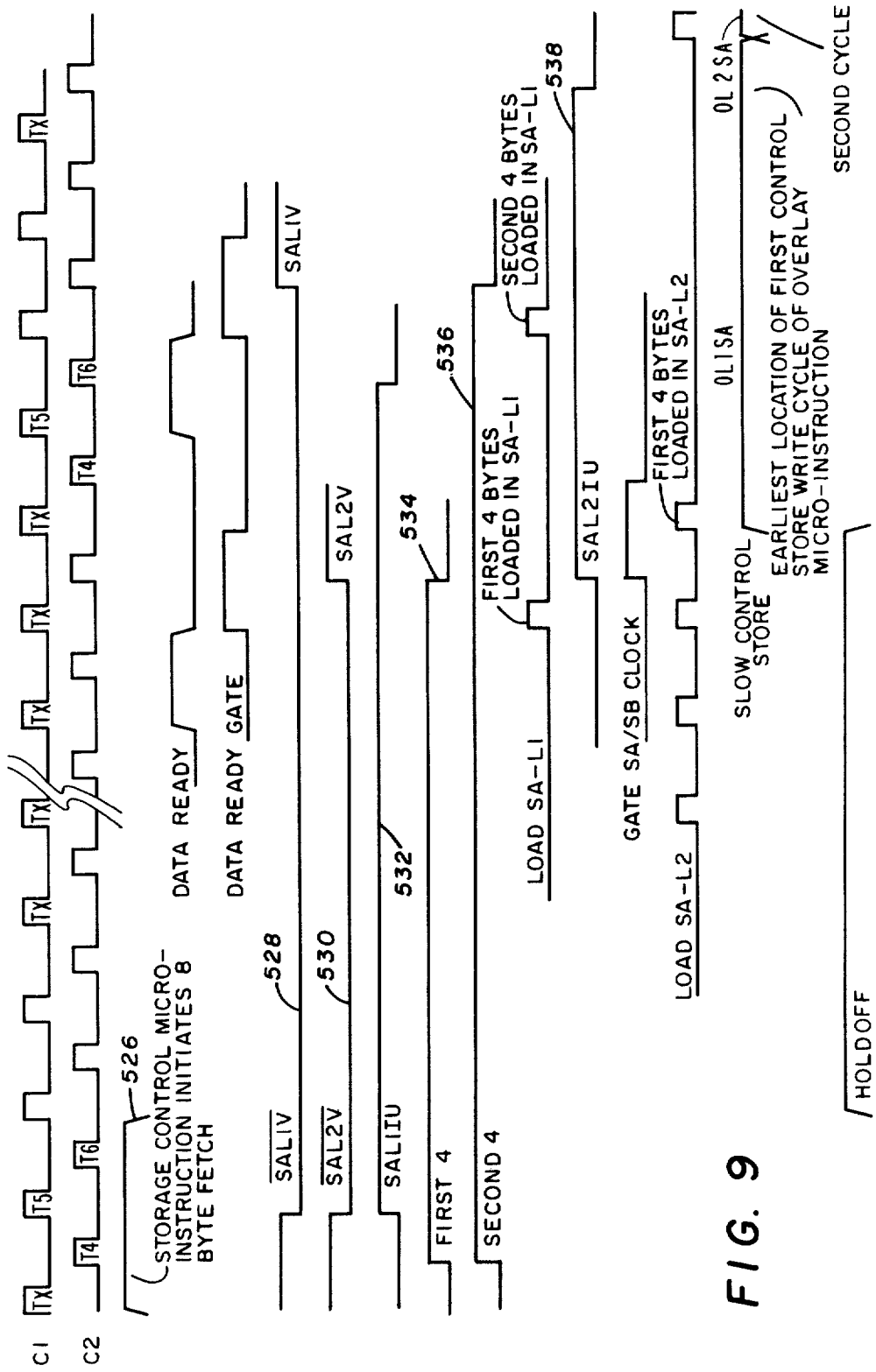

Referring to FIG. 9, there is shown a timing sequence for completing an 8-byte fetch in a SLOW CONTROL STORE mode. The microinstruction 526 is decoded, thereby enabling the setting of the latches 334 and 356 which, in turn enable setting the latches 346 and 366. Latches 384 and 388 are reset and latch 408 is set in the manner already described. This provides the interlock latches shown by the waveforms 528, 530 and 532 and the control gates illustrated by the waveforms 534 and 536. These interlock latches and control gates are identical to the corresponding latches and gates of FIG. 8. The holdoff condition for the microinstruction of FIG. 9 is the same in FIG. 8. The difference between the operation of the microprocessor 14 for the fast control store of FIG. 8 and the slow control store of FIG. 9 is found in the duration of the interlock latch SAL2IU, shown by the waveform 538, and the generation of the LOAD SA-L1 and LOAD SA-L2 CONTROL signals. The effect is to delay the transfer of the second four bytes from SA-L1 register 20 to SA-L2 register 22.

In each of the FIGS. 5-9, the description of the operation of the microprocessor 14 was with reference to the SA-L1 register 20 and the SA-L2 register 22. The microinstructions from the control store 30 thus identify these registers. If the microinstruction identifies the SB-L1 register 24 or the SB-L2 register 26, the operation would be similar as explained with reference to the timing charts of FIGS. 6-9. Thus, the microprocessor 14 is inhibited whenever the registers 20, 22, 24 or 26 are in use and an additional use is identified in a subsequent microinstruction. Further, the microprocessor 14 is inhibited from making use of the data in the registers 20, 22, 24, and 26 when a MAIN STORAGE ERROR is output from the OR gate 44 indicating invalid data in these registers. This condition prevents setting interlock latches generated by the logic of FIG. 4.

Figure 10:
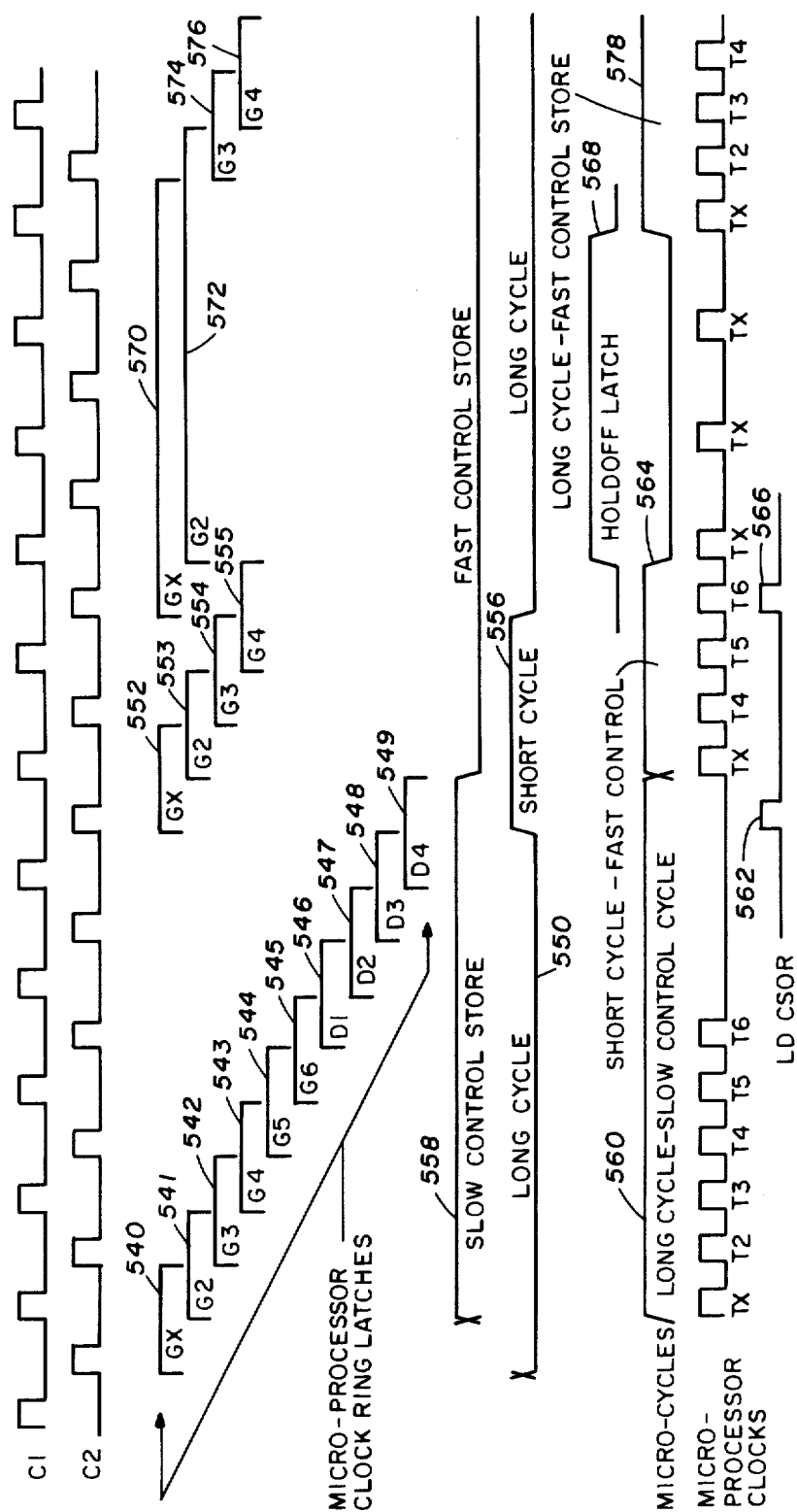

Referring to FIG. 10, there is shown a timing chart for the operation of the holdoff logic of FIG. 5.

Referring to FIG. 10, the operation of the logic of FIG. 5 is synchronized with the clocks C1 and C2. Starting at the beginning of the long and slow cycle interval 550, the clock ring latches 428 and 430-438 generate the latch clocks 540-549. During a short and fast cycle 556, when the decode logic of FIG. 2 generates the SHORT CYCLE CONTROL signal to the inverter 450 and the AND gate 448, the clock ring generates the clocks 552-555. Also controlled by the C1 and C2 clocks is the generation of the microcycles, such as the microcycles 560. During this time interval, the TX and T2-T6 microprocessor clocks are generated by the AND gate array 446. The AND gate 420 then generates a LOAD CSOR pulse 562 at the first occurrence of a C2 clock to the AND gate during the latch clock 549. For a short cycle and fast control store, the microcycle 564 is enabled and the TX and T4-T6 microprocessor clocks are generated. During the microcycle 564, the LOAD CSOR pulse 566 is generated at the next C2 clock during the latch clock 555.

When the holdoff signal 568 is produced at the output of the latch 462, no microcycles are enabled and only the TX microprocessor clock is generated.

During holdoff latch 568, the latch clocks 570 and 572 are generated by the latches 430 and 431, respectively. Resetting the latch 462 allows the microcycles to be again resumed, thereby enabling the latch clocks 574 and 576 to be generated.

For an example of a long cycle and a fast control store, the microcycle 578 is enabled and the TX and T2-T6 microprocessor clocks are generated. FIG. 10 thus represents the operation of the logic of FIG. 5 under various conditions of long cycle and slow control, short cycle and fast control and long cycle and fast control. These are three of the four microcycle combinations that exist in operation of the microprocessor 14.

While only one embodiment of the invention, together with modifications thereof, has been described in detail herein and shown in the accompanying drawings, it will be evident that various further modifications are possible without departing from the scope of the invention.

Having thus described my invention, what I claim as new, and desire to secure by Letters Patent is:

1. Apparatus for interfacing a main store memory operating at a first rate with a central processor operating at a second rate, the central processor including a control store memory having a collection of microinstructions which are selectively accessed and decoded for execution, the main store memory receiving commands and addresses from the central processor and providing a response signal to the central processor at the completion of the command, comprising:

an interface register connected to the main store memory and to the central processor to receive data from either and transfer data to the central processor, a data register connected to the interface register and the main store memory to receive data from the interface register and transfer data to the main store memory, means for decoding microinstructions from the control store memory into main store commands for control of the operation of the main store memory, means for decoding microinstructions from the control store memory into control signals, means responsive to the main store commands, control signals, and the response signal of the main store memory to generate a holdoff signal, means responsive to the holdoff signal to control the operation of the central processor at a rate compatible with the main store memory, said means inhibiting the subsequent execution of microinstructions from integral or non-integral numbers of cycles of the central processor to prevent use or alteration of the contents of the interface or data register, and means responsive to main store commands, the main store response, and control signals to control the transfer of data from the interface register to the data register to permit overlap operation between main store memory and operation of the central processor.

2. Apparatus for interfacing a main store memory as set forth in claim 1 wherein said means for decoding microinstructions includes means for decoding a main store fetch microinstruction into a command, and means for decoding a main store write microinstruction into a command to main store memory.

3. Apparatus for interfacing a main store memory as set forth in claim 1 wherein said means for decoding microinstructions into control signals includes means for decoding microinstructions into source control signals for the interface register.

4. Apparatus for interfacing a main store memory as set forth in claim 3 wherein said means for decoding includes means for decoding microinstructions into destination control signals for the interface register.

5. Apparatus for interfacing a main store memory as set forth in claim 1 wherein said means responsive to main store commands includes interface register interlock means responsive to main store commands and the response signal of the main store memory, and holdoff means responsive to the output of said interlock means, main store commands, and control signals to inhibit the use or alteration of the contents of the interface register.

6. Apparatus for interfacing a main store memory as set forth in claim 5 wherein said interface register interlock means includes means responsive to a main store memory error signal from the interface register and generating an interface register invalid interlock, and said holdoff means includes means responsive to the interface register invalid interlock and a source decode signal for the interface register to inhibit use of the contents of said interface register by the central processor.

7. Apparatus for interfacing a main store memory as set forth in claim 5 wherein said interface register interlock means further includes means responsive to a main store memory error signal from the interface register and generating an interface register invalid interlock, and said holdoff means includes means responsive to the interface register invalid interlock and a destination decode signal for the interface register to inhibit the transfer of data from the central processor to the interface register.

8. Apparatus for interfacing a main store memory as set forth in claim 5 wherein said interface register interlock means includes means responsive to a main store memory fetch command and the response signal of the main store memory to generate an interface register-in-use interlock, and said holdoff means includes means responsive to the interface register-in-use interlock and a main store memory fetch command to inhibit transfer of data into the interface register.

9. Apparatus for interfacing a main store memory as set forth in claim 1 wherein said means responsive to main store commands includes data register interlock means responsive to main store commands, and the response signal of the main store memory, and holdoff means responsive to the output of said interlock means, main store commands, and control signals to inhibit use or alteration of the contents of said data register.

10. Apparatus for interfacing a main store memory as set forth in claim 9 wherein said data register interlock means includes means responsive to a main store write command and a response signal of the main store memory, and said holdoff means includes means responsive to the output of said interlock means, main store memory commands, and control signals to inhibit use or alteration of the contents of said data register.

11. Apparatus for interfacing a main store memory as set forth in claim 9 wherein said data register interlock means includes means for generating a data register-in-use interlock, and said holdoff means includes means responsive to the data register-in-use interlock and a main store write command to inhibit transfer of information from the interface register to the data register.

12. Apparatus for interfacing a main store memory operating at a first rate with a central processor operating at a second rate, the central processor including a control store memory having a collection of microinstructions which are selectively accessed and decoded for execution, the main store memory receiving commands and addresses from the central processor and providing a response signal to the central processor at the completion of the command, comprising:

an interface register connected to a data register and operable as a shift register, the interface register connected to the main store memory and to the central processor to receive data from either and transfer data to the central processor, the data register connected to the interface register and the main storage memory to receive data from the interface register and transfer data to the main store memory, means for decoding microinstructions from the control store memory into main store commands for control of the operation of the main store memory, said means for decoding including means for decoding microinstructions into main store fetch commands, means for decoding microinstructions into main store write commands, and means for decoding microinstructions into shift commands, means for decoding microinstructions from the control store memory into control signals, means responsive to the main store commands, control signals, and the response signal of the main store memory to generate a holdoff signal, means responsive to the holdoff signal to control the operation of the central processor at a rate compatible with the main store memory, said means inhibiting the subsequent execution of microinstructions from integral or non-integral numbers of cycles of the central processor to prevent use or alteration of the contents of the interface or data register, and means responsive to main store commands, the main store response, and control signals to control the transfer of data from the interface register to the data register to permit overlap operation between main store memory and operation of the central processor.

13. Apparatus for interfacing a main store memory as set forth in claim 12 wherein said means responsive to main store commands includes:

an interface register interlock means responsive to a main store fetch command, the response signal of the main store memory, and a memory error signal from the interface register to provide an interface register invalid interlock, and holdoff means responsive to the interface register invalid interlock and the shift commands to inhibit use or alteration of the contents of said interface register.

14. Apparatus for interfacing a main store memory as set forth in claim 12 wherein said means responsive to main store commands include:

data register interlock means responsive to a main store write command and the response signal of the main store memory to generate a data register-in-use interlock, and holdoff means responsive to the data register-in-use interlock and a shift command to inhibit execution of the shift instruction and the subsequent use or alteration of the contents of said data register.

15. Apparatus for interfacing a main store memory operating at a first rate with a central processor operating in a second rate, the central processor including a control store memory having a collection of microinstructions which are selectively accessed and decoded for execution, the main store memory receiving commands and addresses from the central processor including a double fetch command for sequentially transferring two pieces of data to the central processor with a response signal transferred with each data piece, comprising:

an interface register connected to a data register to form a register pair, said interface register connected to the main store memory to receive data therefrom, the data register connected to the interface register and to the control store memory to receive data from the interface register and transfer microinstructions accessed from the main store memory to the control store memory for subsequent execution by the central processor, means for decoding microinstructions from the control store memory into main store commands for control of the operation of the main store memory, said means for decoding including means for decoding a main store double fetch microinstruction into a double fetch command, means for decoding microinstructions from the control store memory into control signals, including decoding microinstructions into source control signals for the data register, and further decoding overlay microinstructions into overlay control signals, means responsive to the main store commands, control signals, and the response of the main store memory to a command to generate holdoff signals including an interface register interlock and a data register interlock, said means including means responsive to the interface register interlock and the data register interlock and control signals to inhibit the use or alteration of data in said interface register, means responsive to the holdoff signals to control the operation of the central processor at a rate compatible with the main store memory, said means inhibiting the subsequent execution of microinstructions from integral or non-integral numbered cycles of the central processor to prevent use or alteration of the contents of the interface or data register, and means responsive to main store commands, the main store response, and control signals to control the transfer of data from the interface register to the data register to permit overlap operation between main store memory and operation of the central processor.

16. Apparatus for interfacing a main store memory as set forth in claim 15 wherein said means responsive to the main store commands includes:

means responsive to a double fetch command, a main store memory error signal from said interface register and a second response of the main store memory to a command to generate an interface register invalid interlock, and holdoff means responsive to the interface register invalid interlock and an overlay command to inhibit execution of the overlay command and use of the contents of the interface register.

17. Apparatus for interfacing a main store memory as set forth in claim 15 wherein said means responsive to the main store command includes:

means responsive to a double fetch command, a main store memory error signal from the interface register and the first response of the main store memory to a command to generate a data register invalid interlock, and holdoff means responsive to the data register invalid interlock and an overlay command to inhibit execution of the overlay command and use of the contents of the data register.

18. Apparatus for interfacing a main store memory as set forth in claim 15 wherein said means responsive to the main store command includes:

means responsive to a double fetch command, an overlay command, and the first response of the main store memory to a command to generate a data register-in-use interlock, and means responsive to the data register-in-use interlock to inhibit the transfer of data from the interface register to said data register.

19. Apparatus for interfacing a main store memory as set forth in claim 15 including a plurality of interface registers and a plurality of data registers with one interface register connected to one data register in a register pair, and said means responsive to the main store commands response to a selected interface register.

20. Apparatus for interfacing a main store memory operating at a first rate with a central processor operating at a second rate, the central processor including a control store memory having a collection of microinstructions which are selectively accessed and decoded for execution, the main store memory receiving commands and addresses from the central processor and providing a response signal to the central processor at the completion of the command, comprising:

a plurality of interface registers individually connected to the main store memory and to the central processor, each register to receive data from either and transfer data to the central processor, a plurality of data registers individually connected to one of the interface registers as an interface register/data register pair, each of said data registers connected to the main store memory to receive data from the interconnected interface register and transfer data to the main store memory, means for decoding microinstructions from the control store memory into main store commands for control of the operation of the main store memory, means for decoding microinstructions from the control store memory into control signals, means responsive to the main store commands, control signals, and the response signal of the main store memory to generate a holdoff signal, means responsive to the hold off signal to control the operation of the central processor at a rate compatible with the main store memory, said means inhibiting the subsequent execution of microinstructions for integral or non-integral numbers of cycles of the central processor to prevent use or alteration of the contents of a selected interface or data register, and means responsive to main store commands, the main store response, and control signals to control the transfer of data from the selected interface register to the interconnected data register to permit overlap operation between main store memory and operation of the central processor.

21. Apparatus for interfacing a main store memory as set forth in claim 20 wherein said means for decoding microinstructions includes means for decoding a main store fetch microinstruction into a command, and means for decoding a main store write microinstruction into a command to main store memory.

22. Apparatus for interfacing a main store memory as set forth in claim 20 wherein said means responsive to main store commands includes interface register interlock means responsive to main store commands and the response signal of the main store memory, and holding means responsive to the output of said interlock means, main store commands, and control signals to inhibit the use or alteration of the contents of an identified one of said interface registers.

23. Apparatus for interfacing a main store memory as set forth in claim 22 wherein said interface register interlock means includes means responsive to a main store memory error signal from the identified interface register and generating an interface register invalid interlock, and said holdoff means includes means responsive to the interface register invalid interlock and a source decode signal for the identified interface register to inhibit use of the contents of said identified interface register by the central processor.

24. Apparatus for interfacing a main store memory as set forth in claim 22 wherein said interface register interlock means further includes means responsive to a main store memory error signal from the identified interface register and generating an interface register invalid interlock, and said holdoff means includes means responsive to the interface register invalid interlock and a destination decode signal for the identified interface register to inhibit the transfer of data from the central processor to the identified interface register.

25. Apparatus for interfacing a main store memory as set forth in claim 22 wherein said interface register interlock means includes means responsive to a main store memory fetch command and the response signal of the main store memory to generate an interface register-in-use interlock, and said holdoff means includes means responsive to the interface register-in-use interlock and a main store memory fetch command to inhibit transfer of data into the identified interface register.

26. Apparatus for interfacing a main store memory as set forth in claim 20 wherein said means responsive to main store commands includes data register interlock means responsive to main store commands, and the response signal of the main store memory, and holdoff means responsive to the output of said interlock means, main store commands, and control signals to inhibit use or alteration of the contents of an identified one of said data registers.

27. Apparatus for interfacing a main store memory as set forth in claim 26 wherein said data register interlock means includes means responsive to a main store write command and a response signal of the main store memory, and said holdoff means includes means responsive to the output of said interlock means, main store memory commands, and control signals to inhibit use or alteration of the contents of the identified data register.

28. Apparatus for interfacing a main store memory as set forth in claim 26 wherein said data register interlock means includes means for generating a data register-in-use interlock, and said holdoff means includes means responsive to the data register-in-use interlock and a main store write command to inhibit transfer of information to the identified data register from the interconnected interface register.

29. Apparatus for interfacing a main store memory operating at a first rate with a central processor operating at a second rate, the central processor including a control store memory having a collection of microinstructions which are selectively accessed and decoded for execution, the main store memory receiving commands and addresses from the central processor and providing a response signal to the central processor at the completion of the command, comprising:

a plurality of interface registers individually connected to one of a plurality of data registers as an interface register/data register pair and operable as a shift register, each of the interface registers connected to the main store memory and to the central processor to receive data from either and transfer data to the central processor, each of the data registers connected to the main storage memory in addition to the interface register to receive data from the interface register and transfer data to the main store memory, means for decoding microinstructions from the control store memory into main store commands for control of the operation of the main store memory, said means for decoding including means for decoding microinstructions into main store fetch commands, means for decoding microinstructions into main store write commands, and means for decoding microinstructions into shift commands, means for decoding microinstructions from the control store memory into control signals, means responsive to the main store commands, control signals, and the response signal of the main store memory to generate a holdoff signal, means responsive to the holdoff signal to control the operation of the central processor at a rate compatible with the main store memory, said means inhibiting the subsequent execution of microinstructions from integral or non-integral numbers of cycles of the central processor to prevent use or alteration of the contents of an identified pair of the interface or data registers, and means responsive to main store commands, the main store response, and control signals to control the transfer of data from an identified one of the interface registers to the data register of the pair to permit overlap operation between main store memory and operation of the central processor.

30. Apparatus for interfacing a main store memory as set forth in claim 29 wherein said means responsive to main store commands includes:

an interface register interlock means responsive to a main store fetch command, the response signal of the main store memory, and a memory error signal from the interface register to provide an interface register invalid interlock, and holdoff means responsive to the interface register invalid interlock and the shift commands to inhibit use or alteration of the contents of said identified interface register.

31. Apparatus for interfacing a main store memory as set forth in claim 29 wherein said means responsive to main store commands include:

data register interlock means responsive to a main store write command and the response signal of the main store memory to generate a data register-in-use interlock, and holdoff means responsive to the data register-in-use interlock and a shift command to inhibit execution of the shift instruction and the subsequent use and alteration of the contents of an identified one of the data registers of a register pair.

32. Apparatus for interfacing a main store memory operating at a first rate with a central processor operating at a second rate, the central processor including a control store memory having a collection of microinstructions which are selectively accessed and decoded for execution, the main store memory receiving commands and addresses from the central processor including a double fetch command for sequentially transferring two pieces of data to the central processor with a response signal transferred with each data piece, comprising:

- a plurality of interface registers individually connected to one of a plurality of data registers to form a plurality of register pairs, each of said interface registers connected to the main store memory to receive data therefrom, the data register for each pair also connected to the control store memory to receive data from the interface register of the pair and transfer microinstructions accessed from the main store memory to the control store memory for subsequent execution by the central processor,
- means for decoding microinstructions from the control store memory into main store commands for control of the operation of the main store memory, said means for decoding including means for decoding a main store double fetch microinstruction into a double fetch command,
- means for decoding microinstructions from the control store memory into control signals, including decoding microinstructions into source control signals for an identified one of the data registers, and further decoding overlay microinstructions into overlay control signals,
- means responsive to the main store commands, control signals, and the response of the main store memory to a command to generate holdoff signals including an interface register interlock and a data register interlock, said means including means responsive to the interface register interlock and the data register interlock and control signals to inhibit the use or alteration of data in an identified one of said interface registers,
- means responsive to the holdoff signals to control the operation of the central processor at a rate compatible with the main store memory, said means inhibiting the subsequent execution of microinstructions from integral or non-integral numbered cycles of the central processor to prevent use or alteration of the contents of the identified interface register or the identified data register, and
- means responsive to main store commands, the main store response, and control signals to control the transfer of data from the identified interface register to the data register of the pair to permit overlap operation between main store memory and operation of the central processor.

33. Apparatus for interfacing a main store memory as set forth in claim 32 wherein said means responsive to the main store commands includes:
- means responsive to a double fetch command, a main store memory error signal from the identified interface register and a second response of the main store memory to a command to generate an interface register invalid interlock, and
- holdoff means responsive to the interface register invalid interlock and an overlay command to inhibit execution of the overlay command and use of the contents of the identified interface register.

34. Apparatus for interfacing a main store memory as set forth in claim 32 wherein said means responsive to the main store command includes:
- means responsive to a double fetch command, a main store memory error signal from the identified interface register and the first response of the main store memory to a command to generate a data register invalid interlock, and
- holdoff means responsive to the data register invalid interlock and an overlay command to inhibit execution of the overlay command and use of the contents of the identified data register for the register pair.

35. Apparatus for interfacing a main store memory as set forth in claim 32 wherein said means responsive to the main store command includes:
- means responsive to a double fetch command, an overlay command, and the first response of the main store memory to a command to generate a data register-in-use interlock, and
- means responsive to the data register-in-use interlock to inhibit the transfer of data from an identified interface register to the data register of the register pair.

36. Apparatus for interfacing a main store memory operating at a first rate with a central processor operating at a second rate, the central processor including a control store memory having a collection of microinstructions which are selectively accessed and decoded for execution, the main store memory receiving commands and addresses from the central processor and providing a response signal to the central processor at the completion of the command, comprising:
- a plurality of interface registers individually connected to the main store memory and to the central processor, each register to receive data from either and transfer data to the central processor,
- a plurality of data registers individually connected to one of the interface registers as an interface register/data register pair, each of said data registers connected to the main store memory to receive data from the interconnected interface register and transfer data to the main store memory,
- means for decoding microinstructions from the control store memory into main store commands for control of the operation of the main store memory,
- means for decoding micro instructions from the control store memory into control signals,
- means responsive to the main store command, control signals, and the response signal of the main store memory to generate a holdoff signal, and
- means responsive to the holdoff signal to control the operation of the central processor at a rate compatible with the main store memory, said means inhibiting the subsequent execution of microinstructions for integral or non-integral numbers of cycles of the central processor to prevent use or alteration of the contents of a selected interface or data register.

37. Apparatus for interfacing a main store memory as set forth in claim 36 wherein said means for decoding microinstructions into control signals includes means for decoding source microinstructions into source control signals for each of said plurality of interface registers, and for decoding destination microinstructions into destination control signals for the interface registers.

38. Apparatus for interfacing a main store memory as set forth in claim 36 wherein said means responsive to main store commands includes interface register interlock means responsive to a main store fetch command and the response signal of the main store memory to provide an interface register-in-use interlock, and holdoff means responsive to the interface register-in-use interlock and a main store memory fetch command to inhibit transfer of data into an identified interface register.

39. Apparatus for interfacing a main store memory as set forth in claim 36 wherein said means responsive to main store commands includes data register interlock means responsive to main store commands, and the response signal of the main store memory for generating a data register-in-use interlock, and holdoff means responsive to the data register-in-use interlock, a main store write command, and control signals to inhibit transfer of information to the identified data register from the interconnected interface register.

40. Apparatus for interfacing a main store memory as set forth in claim 36 wherein said means responsive to main store commands includes interface register interlock means responsive to a main store memory fetch command for an identified interface register and the response signal of the main store memory to generate an interface register invalid interlock, and holdoff means responsive to the interface register invalid interlock, and a destination control signal to inhibit the transfer of data into the identified interface register.

41. Apparatus for interfacing a main store memory as set forth in claim 36 wherein said means responsive to main store commands includes interface register interlock means responsive to a main store memory error signal from an identified interface register and the response signal of the main store memory to generate an interface register invalid interlock, and holdoff means responsive to the interface register invalid interlock and a destination control signal to inhibit transfer of data into the identified interface register.

42. Apparatus for interfacing a main store memory as set forth in claim 36 wherein said means responsive to main store commands includes data register interlock means responsive to a data error signal from an identified data register, and the response signal of the main store memory to generate a data register invalid interlock, and holdoff means responsive to the data register invalid interlock, main store memory commands, and a source control signal to inhibit the transfer of information from the identified data register.

43. Apparatus for interfacing a main store memory as set forth in claim 36 wherein said means for decoding microinstructions includes means for decoding microinstructions into shift commands, and said means responsive to main store commands includes an interface register interlock means responsive to a main store fetch command, the response signal of the main store memory, and a memory error signal from the identified interface register to provide an interface register invalid interlock, said means responsive to main store commands further including data register interlock means responsive to a main store write command and the response signal of the main store memory to generate a data register-in-use interlock, and holdoff means responsive to the interface register invalid interlock, the data register-in-use interlock, and a shift command to inhibit execution of the shift command for an identified interface register/data register pair during the interface register invalid interlock or the data register-in-use interlock.

44. Apparatus for interfacing a main store memory as set forth in claim 36 wherein said means responsive to main store commands includes:

means responsive to a double fetch command, an overlay command, and the first response of the main store memory to a command to generate a data register-in-use interlock, and holdoff means responsive to the data register-in-use interlock and an overlay command to inhibit the transfer of data from an identified interface register to the data register of the register pair.

45. Apparatus for interfacing a main store memory as set forth in claim 36 wherein said means responsive to main store commands includes data register interlock means responsive to main store commands, and the response signal of the main store memory to generate a data register-in-use interlock, and means responsive to the data register-in-use interlock, and a load signal for transferring information from an interconnected interface register to the identified data register of the register pair.

46. Apparatus for interfacing a main store memory as set forth in claim 36 wherein said means for decoding microinstructions into control signals includes means for decoding a main store fetch micro-instruction into a load signal for one of the identified interface registers.

47. Apparatus for interfacing a main store memory as set forth in claim 36 wherein said means responsive to main store commands includes operating cycle means responsive to main store commands and the response signal of the main store memory, and holdoff means responsive to the output of said operating cycle means, main store commands and a short cycle control signal to shorten the operating cycle of the central processor.

48. Apparatus for interfacing a main store memory as set forth in claim 36 wherein said means responsive to main store commands includes operating cycle means responsive to main store commands and the response signal of the main store memory, and holdoff means responsive to the output of said operating cycle means, main store commands and a slow control signal to extend the operating cycle of the central processor.

* * * * *

UNITED STATES PATENT AND TRADEMARK OFFICE
CERTIFICATE OF CORRECTION

PATENT NO. : 4,258,417
DATED : March 24, 1981
INVENTOR(S) : Neil C. Berglund and David A. Luick It is certified that error appears in the above-identified patent and that said Letters Patent are hereby corrected as shown below:

Claim 22, Column 27, Line 8 "holding" should be --holdoff--

Signed and Sealed this

Tenth Day of November 1981

[SEAL]

Attest:

GERALD J. MOSSINGHOFF

*Attesting Officer*  *Commissioner of Patents and Trademarks*